(12) United States Patent
Goin et al.

(10) Patent No.: US 8,832,892 B2
(45) Date of Patent: Sep. 16, 2014

(54) PIVOT DEVICES FOR RAMPS

(71) Applicants: Clay J. Goin, Creston, WA (US); Hugh L. Goin, Creston, WA (US)

(72) Inventors: Clay J. Goin, Creston, WA (US); Hugh L. Goin, Creston, WA (US)

(*) Notice: Subject to any disclaimer, the term of this patent is extended or adjusted under 35 U.S.C. 154(b) by 0 days.

(21) Appl. No.: 13/858,891

(22) Filed: Apr. 8, 2013

(65) Prior Publication Data
US 2013/0219637 A1 Aug. 29, 2013

Related U.S. Application Data

(63) Continuation of application No. 12/412,898, filed on Mar. 27, 2009, now Pat. No. 8,413,280.

(51) Int. Cl.
E01D 1/00 (2006.01)
F16C 11/00 (2006.01)

(52) U.S. Cl.
USPC .......................................... 14/71.1; 403/116

(58) Field of Classification Search
USPC ............ 14/2.4, 69.1, 71.1, 69.5; 16/270, 271; 403/53, 59–61, 116, 119; 414/537, 921
See application file for complete search history.

(56) References Cited

U.S. PATENT DOCUMENTS

| | | | |
|---|---|---|---|
| 2,517,348 A * | 8/1950 | Rachels, Jr. .................... 119/847 |
| 2,779,489 A | 1/1957 | Boom | |
| 3,003,167 A * | 10/1961 | Smith ............................ 14/71.1 |
| 3,365,822 A | 1/1968 | Howie | |
| 3,687,308 A * | 8/1972 | Apelstrand et al. ............ 14/71.3 |
| 3,879,784 A | 4/1975 | Kummerman | |
| 4,003,483 A | 1/1977 | Fulton | |
| 4,110,859 A | 9/1978 | Lichti | |
| 4,133,283 A * | 1/1979 | Ryan ........................ 114/230.18 |
| 4,290,728 A | 9/1981 | Leduc | |
| 4,397,243 A | 8/1983 | Hickman | |
| 4,527,941 A | 7/1985 | Archer | |
| 5,026,243 A | 6/1991 | Dell | |
| 5,133,584 A | 7/1992 | McCleary | |
| 5,133,634 A | 7/1992 | Gingrich et al. | |
| 5,156,432 A | 10/1992 | McCleary | |
| 5,253,410 A | 10/1993 | Mortenson | |
| 5,287,579 A * | 2/1994 | Estevez, Jr. ................... 14/71.1 |
| 5,340,267 A | 8/1994 | Stoll et al. | |
| 5,447,406 A | 9/1995 | Voss | |
| 5,764,437 A | 6/1998 | Meyer et al. | |
| 5,803,523 A * | 9/1998 | Clark et al. .................. 296/26.1 |
| 5,815,870 A | 10/1998 | Deutch et al. | |
| 5,815,871 A | 10/1998 | Borchardt | |
| 5,833,260 A | 11/1998 | York | |
| 5,993,135 A | 11/1999 | Wolgamood | |
| 6,120,234 A | 9/2000 | Dinverno | |
| 6,135,532 A | 10/2000 | Martin | |
| 6,296,290 B1 | 10/2001 | Wolf | |
| 6,390,761 B1 | 5/2002 | Palmer, Jr. et al. | |
| 6,394,734 B1 | 5/2002 | Landoll et al. | |
| 6,431,815 B1 | 8/2002 | Zarzecki et al. | |

(Continued)

Primary Examiner — Abigail A Risic
(74) Attorney, Agent, or Firm — Wells St. John P.S.

(57) ABSTRACT

This invention includes a connection device for securing a ramp to a vehicle. The connection device has a bracket with an upper surface opposite a lower surface. The bracket is configured to be releasably secured to the ramp. A pivot pin extends from the lower surface of the bracket has an end spaced from the bracket. The end of the pivot pin is configured to be received in an opening of a cargo bed in the vehicle. The bracket is capable of being pivoted about the pivot pin along a pivot axis defined by the pivot pin.

20 Claims, 25 Drawing Sheets

(56) References Cited

U.S. PATENT DOCUMENTS

| | | |
|---|---|---|
| 6,592,135 B2 | 7/2003 | Hendrix |
| 6,643,878 B2 | 11/2003 | Schmaltz et al. |
| 6,682,294 B2 | 1/2004 | Carroll |
| 6,701,563 B2 | 3/2004 | Schomaker et al. |
| 6,834,903 B2 | 12/2004 | Harper et al. |
| 6,837,669 B2 | 1/2005 | Reed et al. |
| 6,854,147 B1 | 2/2005 | Ahlsten |
| 6,868,574 B2 | 3/2005 | Schomaker et al. |
| 6,913,305 B1 | 7/2005 | Kern et al. |
| 6,923,140 B1 | 8/2005 | Cook |
| 6,986,633 B2 | 1/2006 | Kellogg et al. |
| 7,013,518 B2 | 3/2006 | Leblanc |
| 7,100,935 B1 | 9/2006 | Dunbar |
| 7,195,301 B2 | 3/2007 | Aulicino |
| 7,237,294 B2 | 7/2007 | Lensing |
| 7,832,975 B1 | 11/2010 | Mitchell |
| 2005/0173892 A1 | 8/2005 | Terminello |
| 2006/0045703 A1* | 3/2006 | Dougherty .................. 414/537 |
| 2009/0050045 A1 | 2/2009 | Grimaldi |

\* cited by examiner

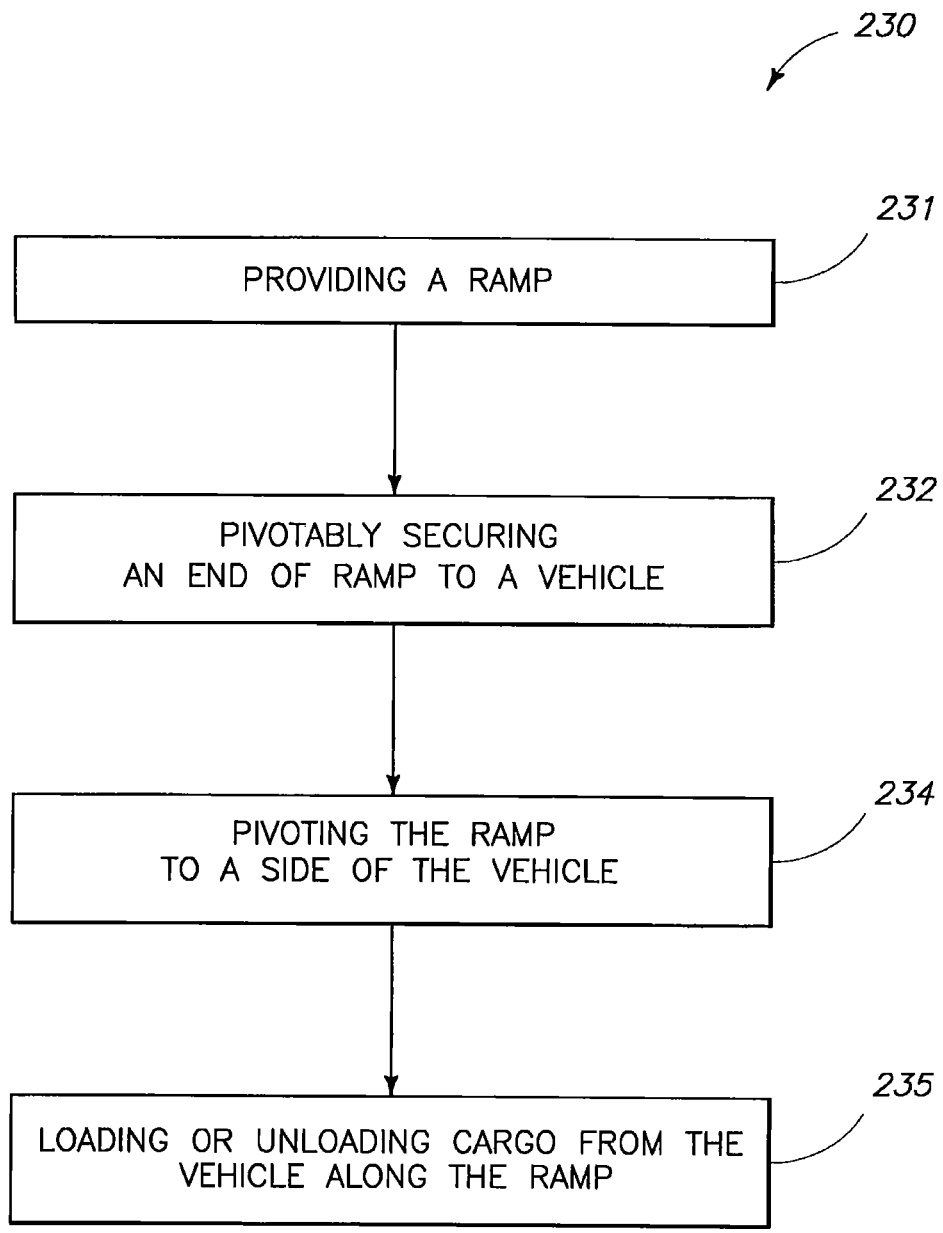

PIVOT DEVICES FOR RAMPS

CROSS REFERENCE TO RELATED APPLICATION

This patent resulted from a continuation application of U.S. patent application Ser. No. 12/412,898, filed Mar. 27, 2009, entitled "Ramp Assemblies, Connection Devices for Ramps, Support Structures for Ramps and Methods for Loading and Unloading a Vehicle", naming Hugh L. Goin and Clay J. Goin as inventors, the disclosure of which is incorporated by reference.

TECHNICAL FIELD

This invention relates to ramp assemblies, connection devices for ramps, support structures for ramps and methods for loading and unloading a vehicle.

BACKGROUND OF THE INVENTION

Ramps are routinely used during the loading and unloading of cargo from vehicles. A simple ramp can include a plank of wood that is positioned to extend from a cargo area of a vehicle to another surface such as the ground.

There is always a need to increase the capabilities and functionality of ramps. Moreover, there is always a need to increase the ease, simplicity and efficiency of using a ramp. Moreover, there is always a need to increase the stability of a ramp during use which additionally increases safety. Still further, there is always a need to increase the ease, simplicity and efficiency of unloading and loading a vehicle.

BRIEF DESCRIPTION OF THE DRAWINGS

Preferred embodiments of the invention are described below with reference to the following accompanying drawings.

FIG. 25 is a flow chart of a method for loading and unloading a vehicle according to one of various embodiments of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
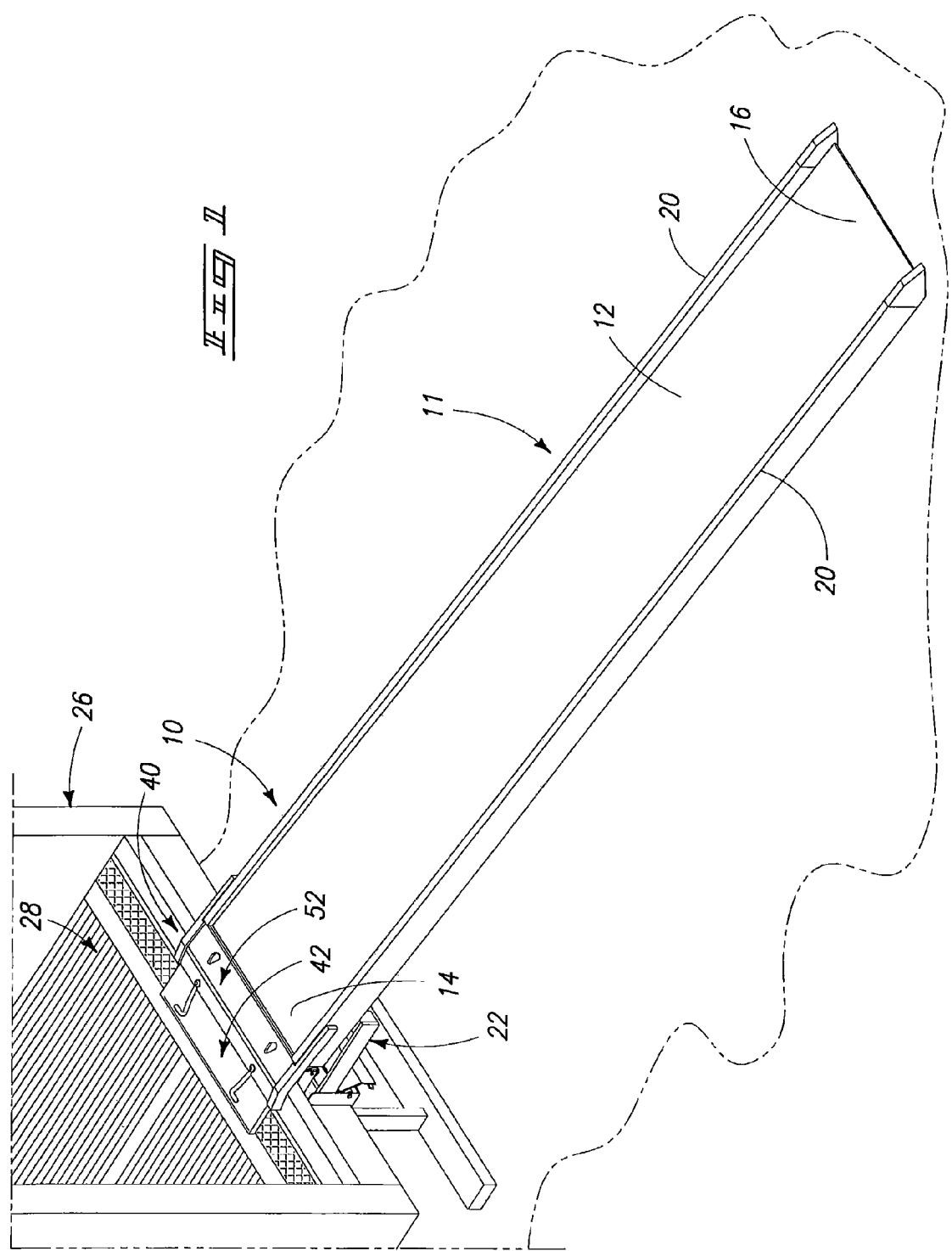
FIG. 1 is a perspective view of a ramp assembly according to one of various embodiments of the invention.

Referring to FIG. 1, an exemplary ramp assembly 10 is illustrated according to one of various embodiments of the invention. An exemplary ramp assembly 10 includes a ramp 11 and a connection device 40 (or attachment apparatus or anchor device) that secures the ramp 11 to a vehicle 26 (connection device 40 discussed more thoroughly subsequently).

An exemplary vehicle 26 includes a cargo vehicle 26 having a cargo bed 28 supporting cargo to be unloaded and/or loaded. One embodiment of an exemplary ramp is manufactured and sold by R-O-M Corporation, located at Belton, Mo.

Another exemplary embodiment of a ramp assembly 10 includes a ramp 11 and a support structure 22 (or biasing component) extending between ramp 11 and vehicle 26 (support structure 22 discussed more thoroughly subsequently). It should be understood that one exemplary embodiment of ramp assembly 10 includes ramp 11 having both the connection device 40 and the support structure 22. Still another exemplary embodiment of ramp assembly 10 includes ramp 11 and the connection device 40 without the support structure 22. And yet another exemplary embodiment of ramp assembly 10 includes ramp 11 and the support structure 22 without the connection device 40.

Still referring to FIG. 1, an exemplary ramp 11 is generally shaped as a rectangle having a planar upper surface 12 that extends from a first end 14 to a second end 16 opposite the first end 14. The upper surface 12 is a load bearing surface to receive and support cargo to be loaded or unloaded from vehicle 26. An exemplary ramp 11 includes a bottom or lower surface 13 beneath (or below or opposite) upper surface 12. In one exemplary embodiment of ramp 11, a pair of side rails 20 extends generally perpendicularly from opposite edges of upper surface 12 and lower surface 13. The side rails 20 can be referred to as a frame 15 for upper and lower surfaces 12 and 13. Other exemplary embodiments of ramp assembly 10 include portions of the side rails 20 with openings (not shown) to be used as handles for gripping of ramp 11. Exemplary handles can extend generally perpendicularly to upper surface 12. Alternatively, handles (not shown) can be added as additional structure to extend from top portions of side rails 20 (perpendicular with planar upper surface 14) at any location along the length of ramp 11. Still further, handles (not shown) can be added as additional structure to extend generally perpendicularly from sidewalls of respective side rails 20 (parallel with planar upper surface 14) at any location along the length of ramp 11.

It should be understood that first end 14 of ramp 11 will be supported on the cargo bed 28 of vehicle 26 and the second end 16 will be supported on a substrate of the environment outside of vehicle 26, for example, the ground, pavement, street, etc. Alternatively, the second end 16 of ramp 11 will be supported on the cargo bed 28 of vehicle 26 and the first end 14 will be supported on a substrate of the environment outside of vehicle 26, for example, the ground, pavement, street, etc. Furthermore, it should be understood that an exemplary ramp 11 will be compatible to be inverted such that upper surface 12 becomes the bottom surface of ramp 11 and that lower surface 13 becomes the load bearing surface of ramp 11 to receive and support cargo to be loaded or unloaded from vehicle 26.

Moreover, it should be understood that an exemplary ramp 11 can be formed from any of a variety of materials such as plastics, thermoplastics, metals, metal alloys and any combination thereof. Exemplary metals or similar material include tin, iron, aluminum, magnesium, zinc and copper, and alloys of any one metal or any combination of the metals. The metals or similar material can be characterized as being ductile and/or malleable. Being ductile and malleable allows for the metal or similar material to be molded into various forms and hardened. Still other exemplary metals for ramp 11 include alloys of metal such as steel, stainless steel, brass and bronze.

Still another exemplary ramp 11 includes structure comprising plastic such as thermoplastic, thermosetting plastic and similar material. These plastic materials can be characterized as being ductile and/or malleable which provides the capability of being molded into various forms and hardened. Furthermore, these plastic materials can be generally characterized by any of various nonmetallic compounds, synthetically produced, usually from organic compounds by polymerization, or formed into pliable sheets or films, fibers, flexible or hard foams. Example plastic materials include polystyrene, acrylonitrile butadiene styrene (ABS), polyamide, polypropylene, polyethylene, and polyvinyl chloride (PVC). Other exemplary nonmetallic compounds include spun glass or fiberglass which is a composite of extremely fine fibers of glass combined with polymers and epoxies. It should further be understood that the materials selected for any one component of the ramp would depend on the amount of stress and/or force (weight) that the one component would be expected to handle.

Exemplary methods of forming exemplary embodiments of ramp 11 include injection molding. Injection molding is a manufacturing process using thermoplastic and/or thermosetting plastic materials described previously (example plastic materials include polystyrene, acrylonitrile butadiene styrene (ABS), polyamide, polypropylene, polyethylene, and polyvinyl chloride (PVC)). An overview of an injection molding process includes molten plastic being injected at high pressure into a mold wherein the mold is an inverse design of the shape of components of ramp 11. Still another exemplary method of forming a ramp 11 includes die casting. Die casting is a manufacturing process using metals and/or metal alloys described previously (example metals or metal alloys include tin, iron, aluminum, magnesium, zinc and copper, and alloys of any one metal or any combination of the metals). An overview of a die casting process includes molten metal being injected at high pressure into a mold wherein the mold is an inverse design of the shape of a ramp 11. Yet other exemplary methods of forming ramp 11 include: permanent mold casting, extrusion, forging, sand casting, powder metallurgy, ceramic mold casting, plaster mold casting and centrifugal casting.

Moreover, an exemplary upper surface 12 of ramp 11 can have any surface configuration such as a smooth planar surface, a perforated surface, a surface with ridges, or any rough surface to provide traction, and any combination thereof. That is, an exemplary upper surface 12 can have any of a variety of surface configurations from a planar surface to an extremely rough surface and any surface configuration in between the two extremes. Furthermore, upper surface 12 can have geometric shapes other than rectangular, for example, square, circular, diamond and any polygonal shape.

Figure 2:
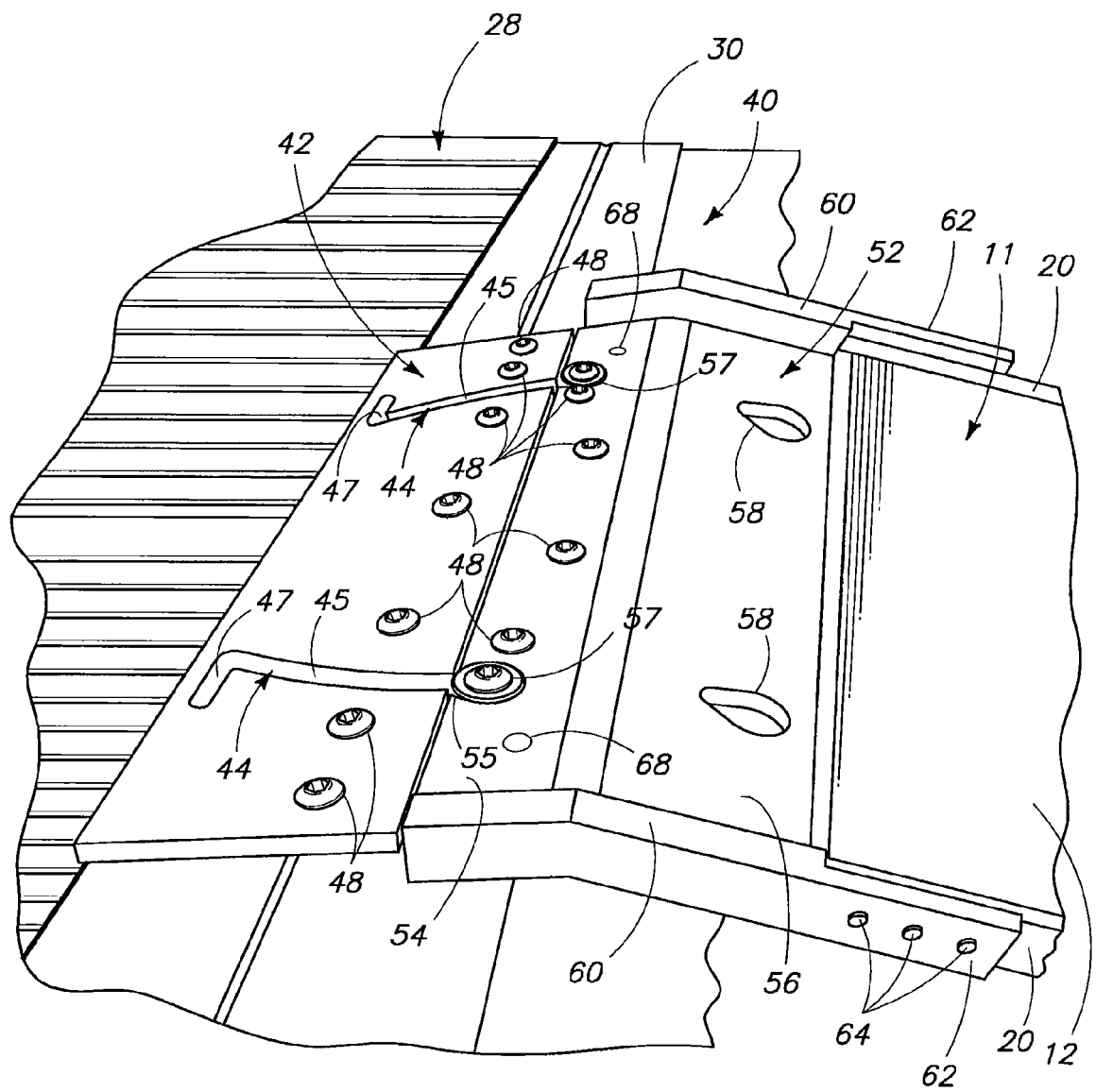
FIG. 2 is a partial perspective view of the ramp assembly of FIG. 1 illustrating a connection device for ramps according to one of various embodiments of the invention.

Referring to FIG. 2, an exemplary connection device 40 is illustrated according to one of various embodiments of the invention. Connection device 40 is supported on the cargo bed 28 of vehicle 26 and selectively releases and secures the first end 14 of ramp 11 in a pivoting relationship to the rearmost portion 30 of the cargo bed 28. An exemplary connection device 40 includes a guide bracket 42 positioned adjacent, and cooperating with, a ramp bracket 52. Both brackets 42 and 52 are secured together by bracket bolts 48 and a hinge (not seen in this Fig.) discussed more thoroughly subsequently. An exemplary guide bracket 42 is generally planar and rectangular having a pair of guide slots or grooves 44 spaced apart from each other. It should be understood that guide slots 44 are openings that extend entirely through guide bracket 42. Each exemplary guide slot 44 has a slightly arched or curved portion 45 terminating with a linear portion 47 angled relative the curved portion 45. In another embodiment, each guide slot 44 will only have the curved portions 45. In still another embodiment, only one guide slot 44 will have both the curved portion 45 and the linear portion 47.

It should be understood that exemplary components and structures of exemplary connection devices 40 can be formed from any of a variety of materials such as plastics, thermoplastics, metals, metal alloys and any combination thereof. Exemplary metals or similar material include tin, iron, aluminum, magnesium, zinc and copper, and alloys of any one metal or any combination of the metals. The metals or similar material can be characterized as being ductile and/or malleable. Being ductile and malleable allows for the metal or similar material to be molded into various forms and hardened. Still other exemplary metals for connection devices 40 include alloys of metal such as steel, stainless steel, brass and bronze.

Still another exemplary connection device 40 includes structure comprising plastic such as thermoplastic, thermosetting plastic and similar material. These plastic materials can be characterized as being ductile and/or malleable which provides the capability of being molded into various forms and hardened. Furthermore, these plastic materials can be generally characterized by any of various nonmetallic compounds, synthetically produced, usually from organic compounds by polymerization, or formed into pliable sheets or films, fibers, flexible or hard foams. Example plastic materials include polystyrene, acrylonitrile butadiene styrene (ABS), polyamide, polypropylene, polyethylene, and polyvinyl chloride (PVC). Other exemplary nonmetallic compounds include spun glass or fiberglass which is a composite of extremely fine fibers of glass combined with polymers and epoxies. It should further be understood that the materials selected for any one component of the connection device 40 would depend on the amount of stress and/or force (weight) that the one component would be expected to handle.

Exemplary methods of forming exemplary embodiments of connection device 40 include injection molding. Injection molding is a manufacturing process using thermoplastic and/or thermosetting plastic materials described previously in (example plastic materials include polystyrene, acrylonitrile butadiene styrene (ABS), polyamide, polypropylene, polyethylene, and polyvinyl chloride (PVC)). An overview of an injection molding process includes molten plastic being injected at high pressure into a mold wherein the mold is an inverse design of the shape of components of connection device 40. Still another exemplary method of forming connection device 40 includes die casting. Die casting is a manufacturing process using metals and/or metal alloys described previously in which to form the connection device 40 (example metals or metal alloys include tin, iron, aluminum, magnesium, zinc and copper, and alloys of any one metal or any combination of the metals). An overview of a die casting process includes molten metal being injected at high pressure into a mold wherein the mold is an inverse design of the shape of components of the connection device 40. Yet other exemplary methods of forming connection device 40 include: permanent mold casting, extrusion, forging, sand casting, powder metallurgy, ceramic mold casting, plaster mold casting and centrifugal casting.

Still referring to FIG. 2, an exemplary ramp bracket 52 includes a first portion 54 angled relative a second portion 56. In this orientation of guide bracket 42 relative ramp bracket 52, an exemplary first portion 54 is adjacent and generally parallel with guide bracket 42. Moreover, first portion 54 has a pair of spaced slot portions 55 (only one partially shown in cut-away fashion) aligned with guide slots 44 of guide bracket 42. It should be understood that slot portions 55 are openings that extend entirely through first portion 54. In this orientation of connection device 40, an anchor or guide pin 57 rests in respective slot portions 55 of ramp bracket 52. It should be understood that different orientations of connection device 40 relative cargo bed 28 has guide pins 57 moving through and being positioned at any one location in guide slots 44 of guide bracket 42. An exemplary second portion 56 of ramp bracket 52 has a pair of spaced storage openings 58. Storage openings 58 are configured to be aligned to receive portions of guide pins 57 when guide bracket 42 is positioned beneath ramp bracket 52 in a folded position discussed more thoroughly subsequently.

Still referring to FIG. 2, an exemplary ramp bracket 52 further includes guide rails 60 on opposite sides of ramp bracket 52 and extending along the first portion 54 and the second portion 56. Guide rails 60 extend generally perpendicularly to upper surfaces of respective first and second portions 54 and 56. Additionally, top surfaces of guide rails 60 are angled generally parallel with respective upper surfaces of first and second portions 54 and 56 of ramp bracket 52. Moreover, guide rails 60 extend past second portion 56 to form attachment arms 62 configured to be positioned adjacent and outside of side rails 20 of ramp 11. Bolts 64 extend through attachment arms 62 and side rails 20 to secure ramp 11 to connection device 40. It should be understood that in alternative embodiments of the invention, attachment arms 62 can extend beneath ramp 11 adjacent the inside of side rails 20 wherein connection device 40 is secured to ramp 11 with bolts 64 extending through attachment arms 62 beneath ramp 11 and adjacent the inside of side rails 20.

In one exemplary embodiment of connection device 40, upper surfaces of respective first and second portions 54 and 56 are smooth. In another exemplary embodiment of connection device 40, patterns of grooves or ridges (not shown) can be formed in upper surfaces of respective first and second portions 54 and 56 to provide traction. Still further in another exemplary embodiment of connection device 40, traction plates (shown subsequently) can be provided over upper surfaces of respective first and second portions 54 and 56 to provide traction.

Figure 3:
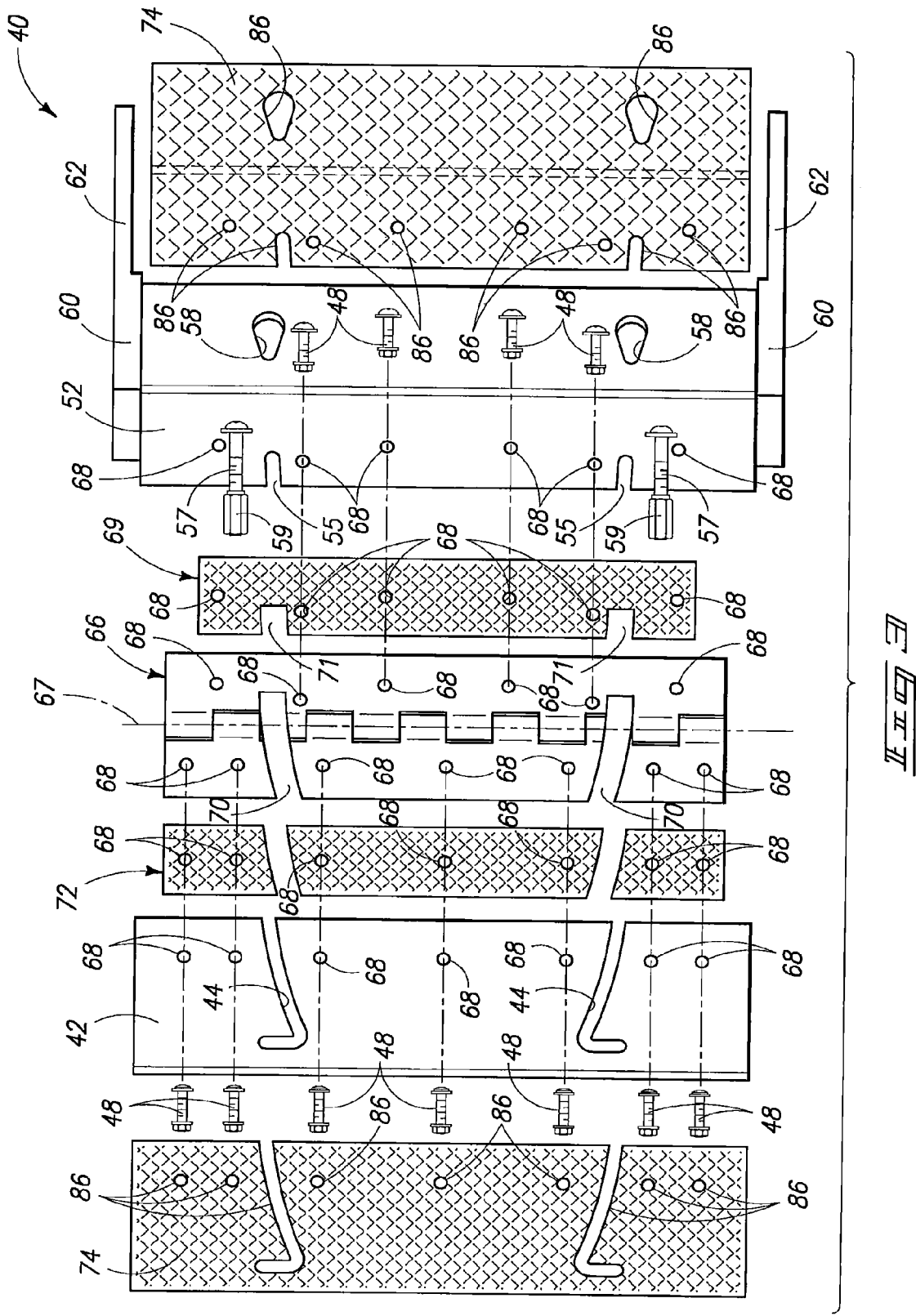
FIG. 3 is an exploded view of a connection device for ramps according to one of various embodiments of the invention.

Referring to FIG. 3, structural components of an exemplary connection device 40 are illustrated according to an embodiment of the invention. A hinge 66 is secured to bottom surfaces of guide bracket 42 and ramp bracket 52 to provide rotational or pivoting action between brackets 42 and 52 along a rotational or pivot axis 67. Hinge 66 has slots 70 configured to be aligned with guide slots 44 of guide bracket 42 and slot portions 55 of ramp bracket 52 during attachment of hinge 66 to brackets 42 and 52. Hinge 66 further includes bolt openings 68 to receive bracket bolts 48 (shown with respective nuts) for securement between respective brackets 42 and 52. In one embodiment, connection device 40 includes a first spacer plate 69 that is to be positioned between hinge 66 and the bottom surface of the first portion 54 of ramp bracket 52. The first spacer plate 69 has bolt openings 68 to receive bracket bolts 48 for securement between hinge 66 and ramp bracket 52. First spacer plate 69 further includes slits 71 configured to be aligned with slots 70 of hinge 66 and slot portions 55 of ramp bracket 52 during attachment of first spacer plate 69 between hinge 66 and ramp bracket 52.

In yet another embodiment of connection device 40, a second spacer plate 72 includes three separate segments to be positioned between hinge 66 and the bottom surface of guide bracket 42. It should be understood that connection device 40 does not have to include either one or both of first spacer plate 69 and second spacer plate 72. Spacer plates 69 and 72 are provided to establish a planar surface generally across an entirety of the width of ramp 11 for securement of hinge 66 thereupon. The segments of second spacer plate 72 are configured to be positioned on opposite sides of slots 70 of hinge 66. Each segment of second spacer plate 72 has bolt openings 68 to receive bracket bolts 48 for securement between hinge 66 and guide bracket 42.

Still referring to FIG. 3, exemplary guide pins 57 include coupler portions 59 at one end. The coupler portions 59 are configured to be received in openings or holes 61 (shown in FIG. 11) in a rearmost portion of cargo bed 28 of vehicle 26 when guide bracket 42 is positioned relative ramp bracket 52 as shown in FIG. 2. It should be understood that connection device 40 does not have to include second spacer plate 72. Alternatively, another embodiment of connection device 40 has only one, or at least one, of first and second spacer plates 69 and 72. It should be understood that slot portions 55, slits 71, slots 70 and guide slots 44 are all aligned to allow guide pins 57 to move between ramp bracket 52 and guide bracket 42. For yet another embodiment, connection device 40 can include at least one traction plate 74 provided over either one of ramp bracket 52 and guide bracket 42. Alternatively, an embodiment of connection device 40 can have a traction plate 74 for both ramp bracket 52 and guide bracket 42, or none at all. It should be understood that traction plates 74 would have slots, grooves and openings (all collectively referenced as 86) to correspond with respective brackets 42 and 52 to accommodate receipt and movements of guide pins 57 and bracket bolts 48.

Figure 4:
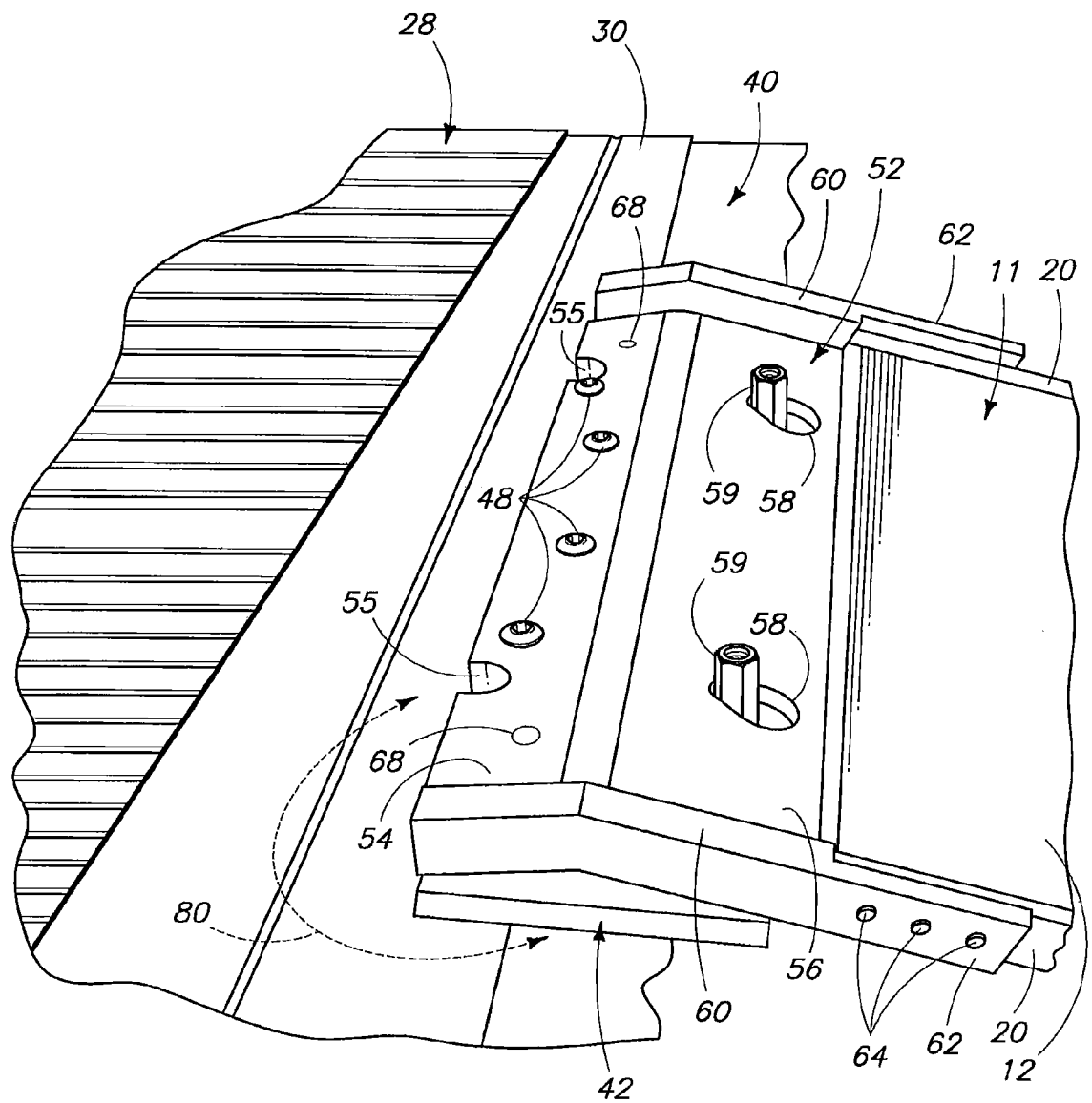
FIG. 4 is a partial perspective view of the ramp assembly of FIG. 1 illustrating the connection device of FIG. 2 according to one of various embodiments of the invention.

Referring to FIG. 4, and considering the orientation of guide bracket 42 relative ramp bracket 52 shown in FIG. 2, guide bracket 42 is rotated or pivoted along direction 80 about pivot axis 67 of hinge 66. Guide bracket 42 can rotate approximately 180° to rest beneath or under ramp bracket 52. The orientation of guide bracket 42 relative ramp bracket 52 shown in FIG. 4 can be referred to as the closed or folded position of connection device 40. Furthermore, the orientation of guide bracket 42 relative ramp bracket 52 shown in FIG. 2 can be referred to as the open or unfolded position of connection device 40. In the folded position, the coupler portions 59 of guide pins 57 have moved through storage openings 58 of ramp bracket 52 and rest extending elevationally above the upper surface of ramp bracket 52. It should be understood that for one embodiment of the invention, and before providing connection device 40 in the folded position, guide pins 57 are moved to the terminal end of the linear portion 47 of guide slots 44 which aligns guide pins 57 to be received through storage openings 58 in the folded position of connection device 40.

Figure 5:
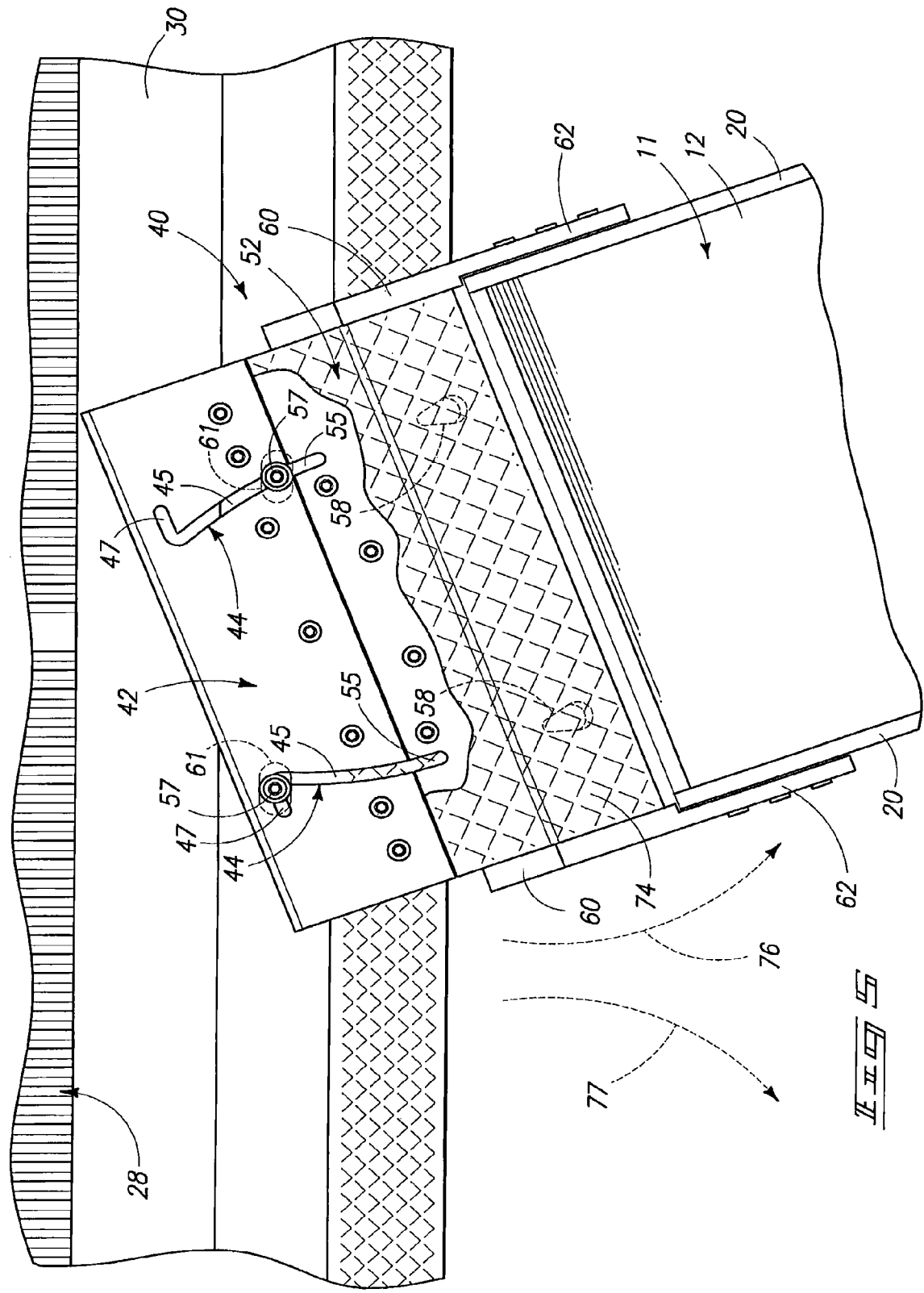
FIG. 5 is a partial top view of the ramp assembly of FIG. 1 illustrating the connection device of FIG. 2 according to one of various embodiments of the invention.

Referring to FIG. 5, the pivoting or rotational capabilities of ramp 11 are illustrated according to one exemplary embodiment of the invention. First consider the position of ramp 11 shown generally in FIG. 1 wherein the length of ramp 11 extends generally directly backwardly from the cargo area and downwardly from the cargo bed 28. That is, if the ramp 11 is lifted to be positioned in the same plane as the cargo bed 28, the length dimension of ramp 11 would be collinear with the length dimension of cargo bed 28. Now referring to FIG. 5 again, the ramp 11 can be pivoted or rotated in alternative directions along direction arrows 76 and 77 to have the length dimension of ramp 11 angled to the right or left (from this perspective) relative the length dimension of cargo bed 28.

Figure 6:
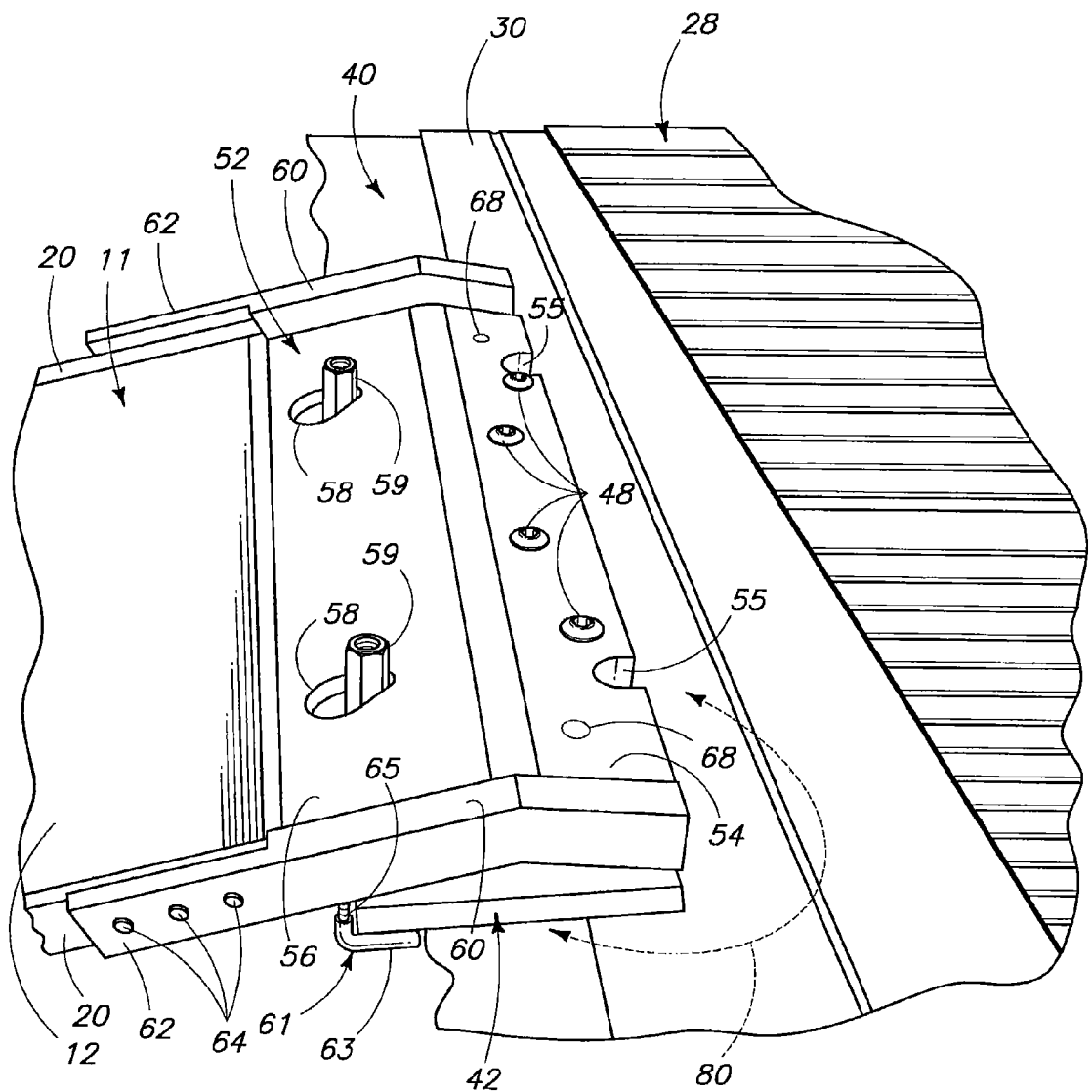
FIG. 6 is a partial perspective view of the ramp assembly of FIG. 1 illustrating the connection device of FIG. 2 according to one of various embodiments of the invention.
Figure 7:
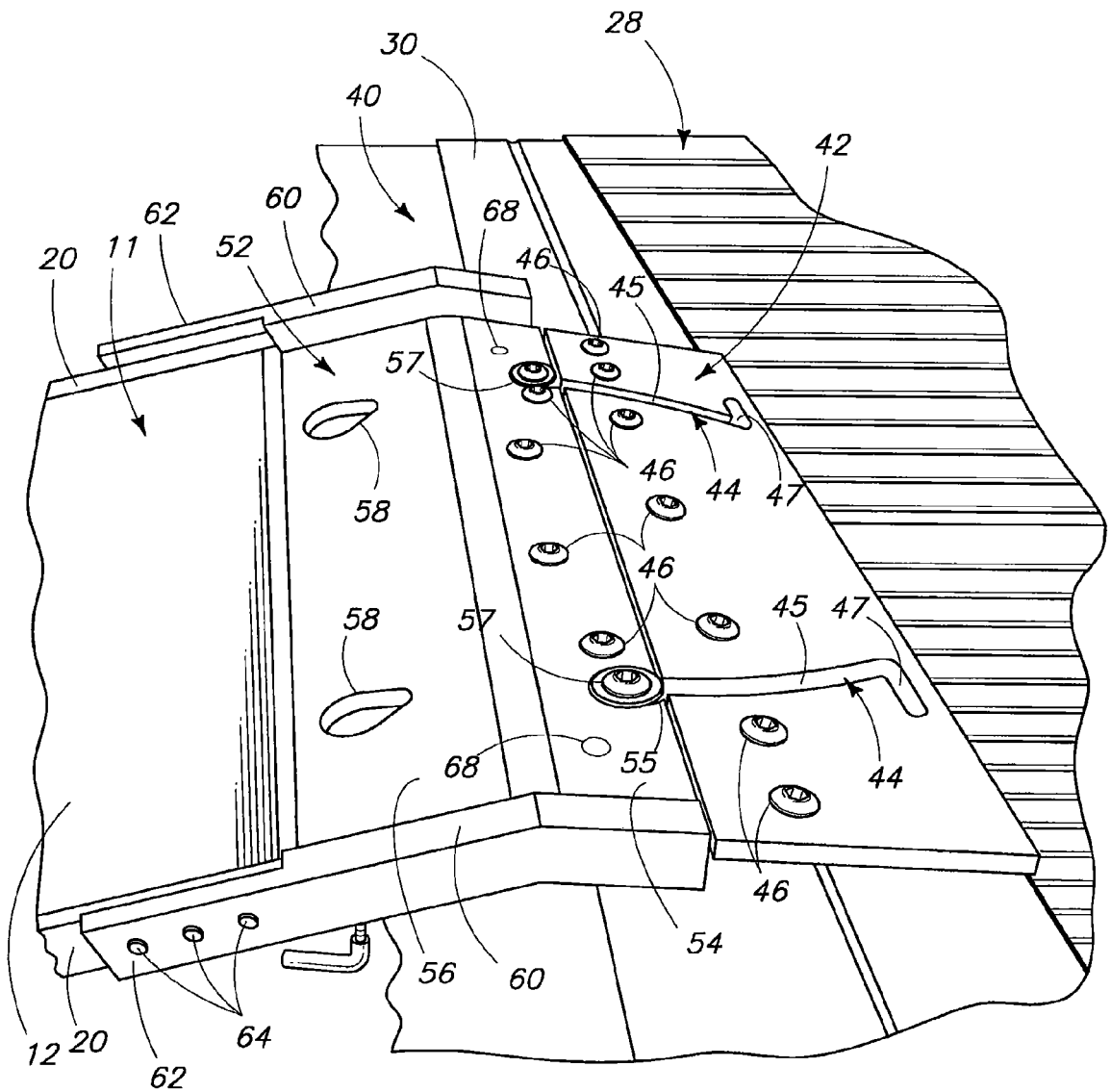
FIG. 7 is a partial perspective view of the ramp assembly of FIG. 1 illustrating the connection device of FIG. 2 according to one of various embodiments of the invention.

Referring to FIGS. 6-7, another embodiment of an exemplary connection device 40 is shown. In FIG. 6, the folded position is shown and connection device 40 includes a lock 61 having a finger 63 extending generally 90° from a stem 65 that is rotationally secured in the bottom of guide rails 60. Alternatively, an exemplary lock 61 is rotationally secured in the bottom of ramp bracket 52 inward of guide rails 60 and more proximate storage openings 58. After pivoting guide bracket 42 in the folded position beneath ramp bracket 52, lock 61 can be rotated about stem 65 to move finger 65 beneath guide bracket 42 to hold guide bracket 42 and maintain connection device 40 in the folded position. In FIG. 7, lock 61 has been rotated to move finger 65 in a position that is not beneath guide bracket 42 which allows guide bracket 42 to be rotated or pivoted along direction 80 until connection device 40 is again in the unfolded position.

Figure 8:
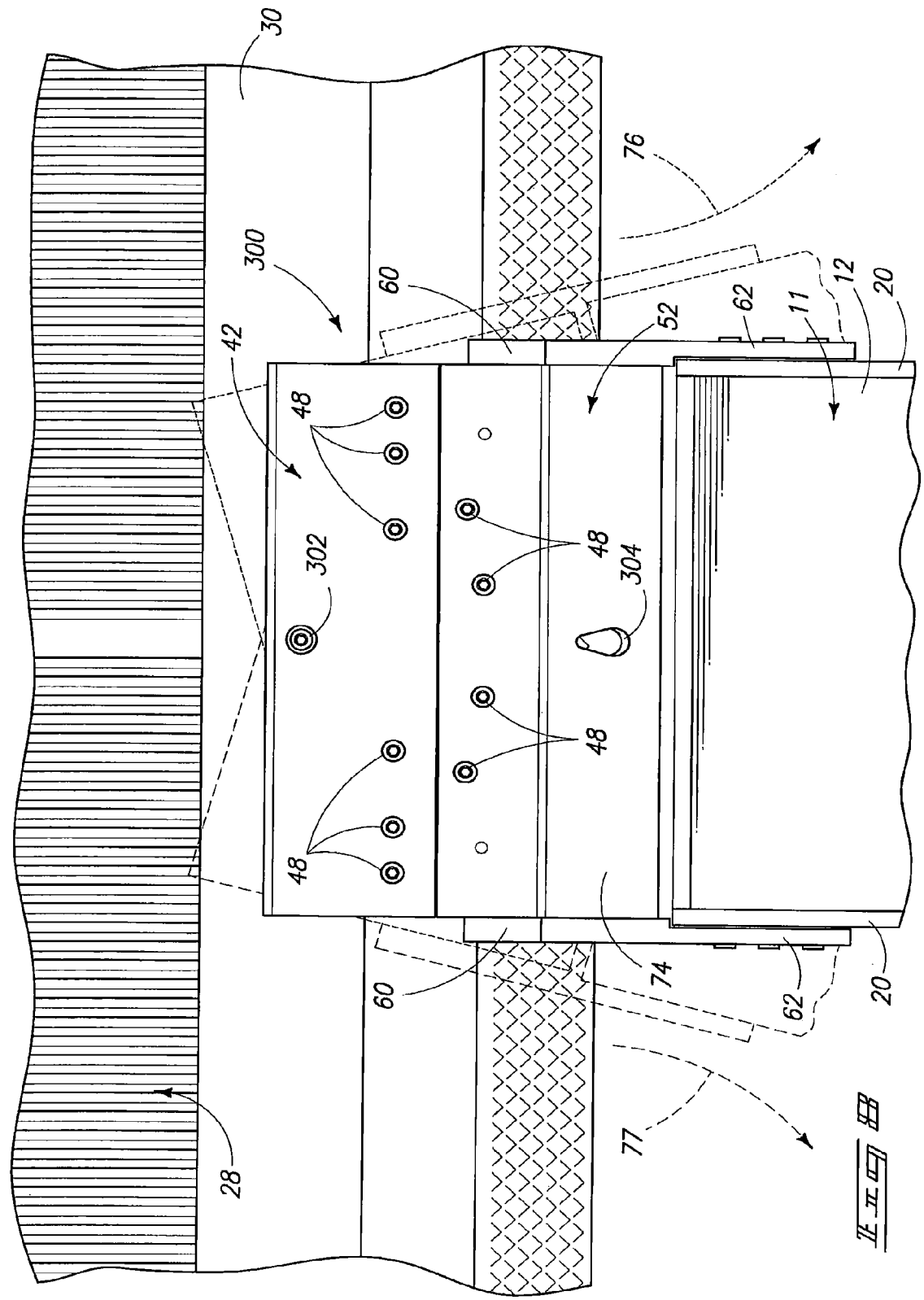
FIG. 8 is a partial perspective view of a ramp assembly according to another one of various embodiments of the invention and illustrating a connection device for ramps according to another one of various embodiments of the invention.

Referring to FIG. 8, another exemplary connection device 300 is illustrated according to one of various embodiments of the invention. Similar structures and components described with respect to connection device 40 will be numbered the same as previously referenced. Connection device 300 does not have guide slots or grooves 44 and includes one pivot pin 302 extending through an opening (not shown) through guide bracket 42. In one embodiment of pivot pin 302, pivot pin 302 include coupler portions (not shown) at one end which are positioned in openings or holes 61 (not shown) in the rearmost portion 30 of cargo bed 28 of vehicle 26. In this embodiment of connection device 300, guide bracket 42 is capable of pivoting or rotating beneath ramp bracket 52 in the folded position. Accordingly, ramp bracket 52 includes only one storage opening 304 which is aligned to receive portions of pivot pin 302 when guide bracket 42 is positioned beneath ramp bracket 52 in the closed or folded position.

Still another exemplary connection device, not shown, according to one of various embodiments of the invention is described. Similar structures and components described with respect to connection device 40 will be noted as needed. The another connection device does not have guide slots or grooves 44 and includes at least one, or more, pivot pins extending from the bottom surface of guide bracket 42. The pivot pin(s) can be permanently affixed to the bottom surface of guide bracket 42. Alternatively, the pivot pin(s) can be integral with the bottom surface of guide bracket 42, that is, the pivot pin(s) are formed as one piece with the guide bracket 42. It should be understood that the configuration of the pivot pin(s) would be designed to be received in the opening(s) of the cargo bed wherein pivot action of ramp assembly 10 is provided most efficiently and effectively. Moreover, it should be understood that a corresponding number of storage openings 58 is provided to receive the pivot pin(s) when the another connection device is folded in the closed position. Alternatively, the another connection device can be designed without the folding capability, for example, wherein guide bracket 42 and ramp bracket 52 are formed as a single structure without hinge 66. Accordingly, the another connection device which is designed without the folding capability would not need the storage openings 58 nor the bracket bolts 48.

It should be understood that as an exemplary ramp 11 of ramp assembly 10 decreases in length, in one embodiment of the invention, the length of curved portions 45 of guide grooves 44 increase to accommodate movement of guide pins 57. Alternatively, it should be understood that as an exemplary ramp 11 of ramp assembly 10 increases in length, in another embodiment of the invention, the length of curved portions 45 of guide grooves 44 decrease.

There has been a long felt need in the industry for a ramp to have the capability of pivoting relative the cargo bed of a vehicle as such increases the functionality of a ramp. This pivoting capability solves the long felt need for increasing the ease, simplicity and efficiency of unloading and loading a vehicle by using the inventive ramp assembly 10. Moreover, the inventive connection device 40 provides a pivoting ramp with increase increased stability during use, and therefore, safety is increased.

Continuing with discussion of an exemplary support structure 22, and to facilitate the description, an exemplary ramp carriage 200 is described. In one exemplary embodiment of the invention, the exemplary vehicle 26 includes a ramp carriage 200 (hereinafter "carriage") to store ramp assembly 10 during nonuse. The exemplary carriage 200 is secured to vehicle 26 below the cargo area between suspensions and wheels of vehicle 26 opposite the cargo bed 28. In one exemplary embodiment, carriage 200 is configured as a box missing one planar side of the standard six planar sides of a box. That is, the one planar side missing is located at one end of the box to function as an open end 192 for receiving ramp assembly 10. Accordingly, open end 192 of carriage 200 is positioned at the rear of the vehicle 26 so ramp assembly 10 can be accessed. One embodiment of an exemplary carriage is manufactured and sold by R-O-M Corporation, located at Belton, Mo.

Alternatively, another exemplary embodiment of the carriage 200 is configured as a box missing two planar sides of the standard six-sided box. That is, in addition to the open end 192, the carriage 200 has a top side missing. The portion of vehicle 26 below the cargo bed 28 acts as the top side or roof of the carriage 200 wherein the sidewalls of carriage 200 are secured to the vehicle. It should be understood that when ramp assembly 10 is stored in carriage 200 during nonuse, connection device 40 is in the folded position and located at the front end of carriage 200 (opposite end from open end 192 of carriage 200) proximate the cab of vehicle 26. Additionally, it should be understood that carriage 200 will have dimensions to accommodate receipt of ramp assembly 10 during storage.

Figure 9:
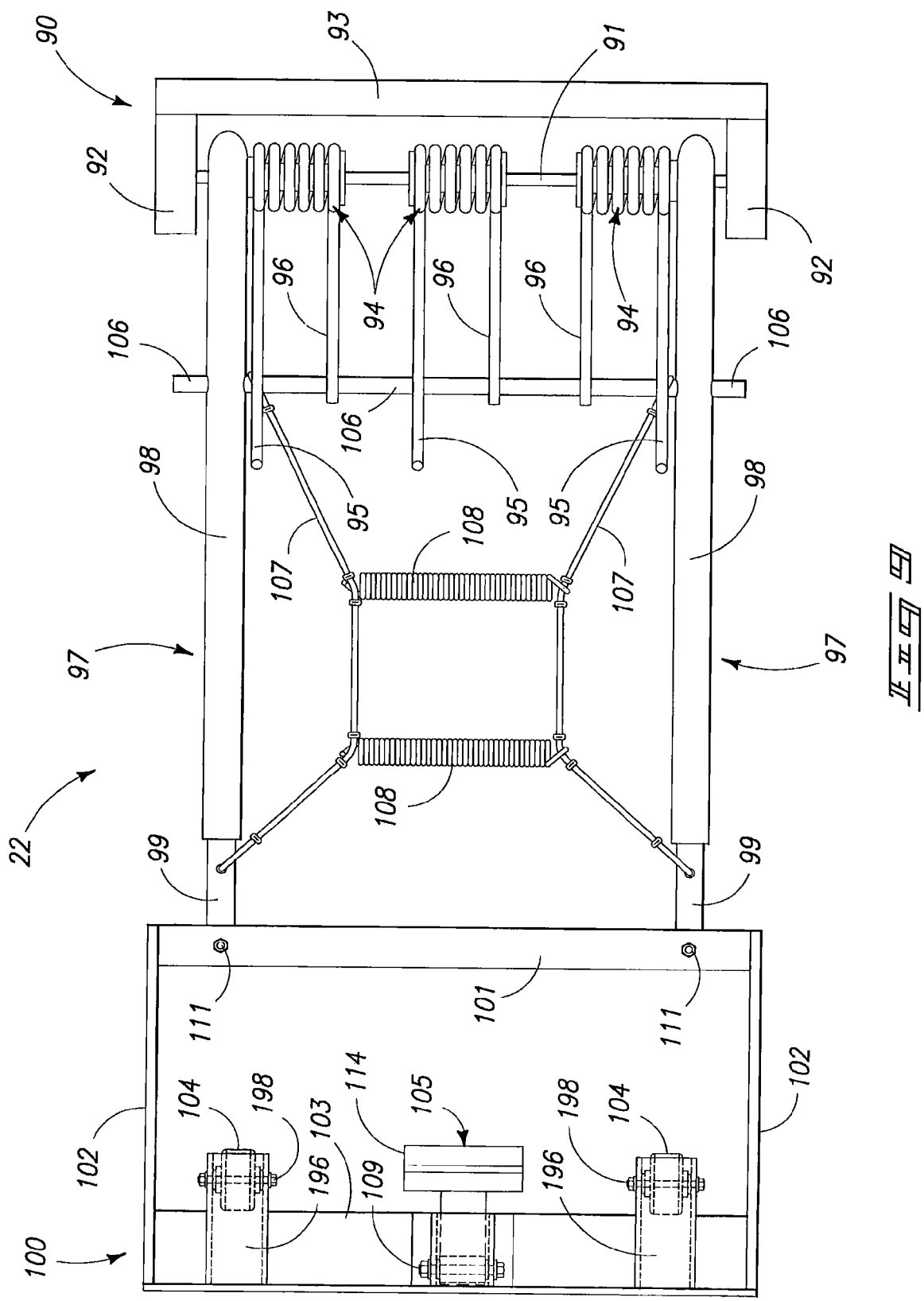
FIG. 9 is a plan view of a support structure for ramps according to one of various embodiments of the invention.
Figure 10:
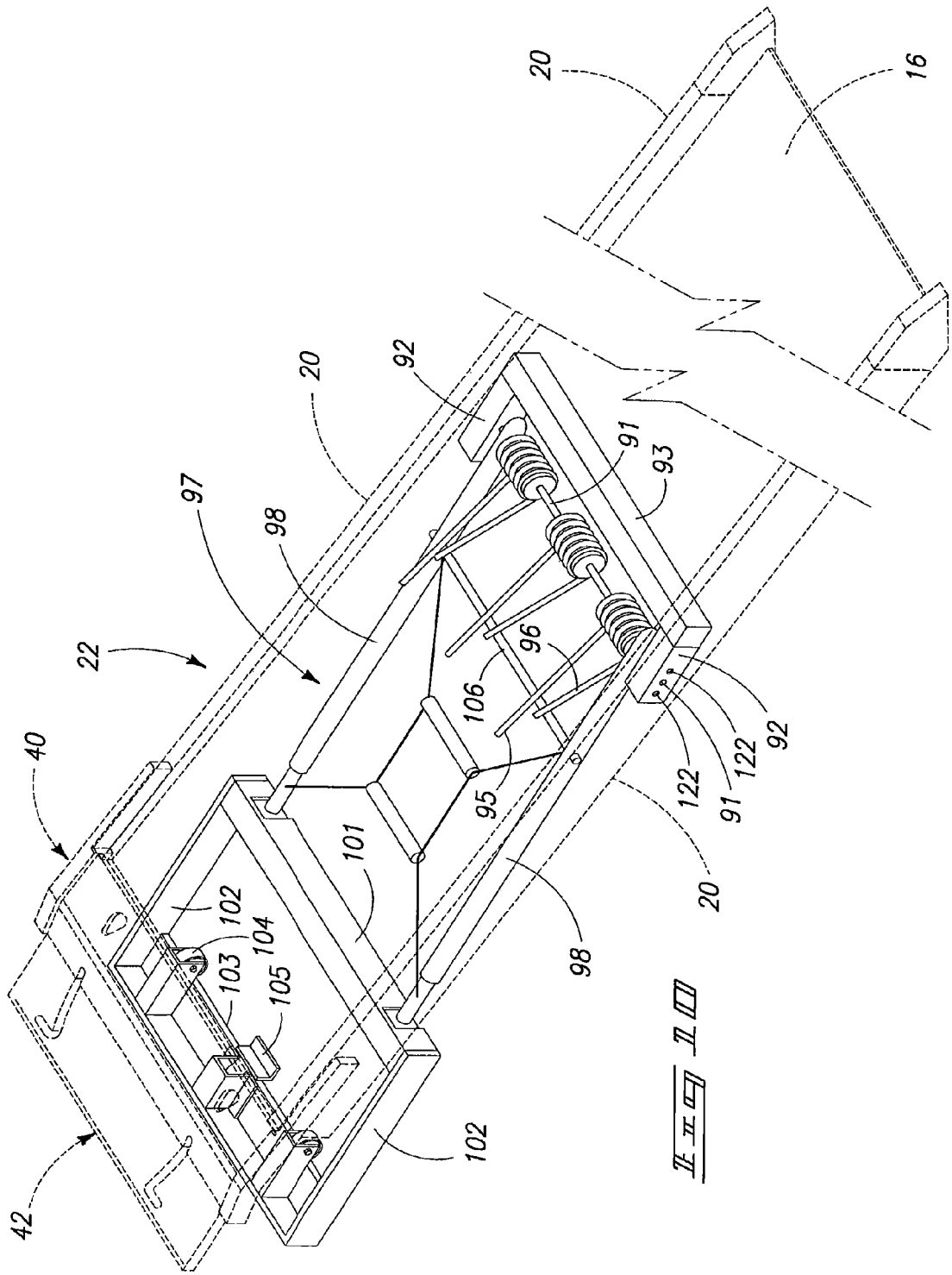
FIG. 10 is a perspective view of the ramp assembly of FIG. 1 emphasizing the support structure of FIG. 9 according to one of various embodiments of the invention.

Referring to FIGS. 9-10, an exemplary ramp assembly 10 includes an exemplary support structure 22 which is illustrated according to one of various embodiments of the invention. FIG. 9 illustrates components of support structure 22. FIG. 10 illustrates support structure 22 in general cooperation with ramp 11 wherein ramp assembly 10 can be referred to as being in an extended position. The extended position of ramp assembly 10 is the orientation for maneuvering and using ramp 11 for loading and unloading cargo. It should be understood that when ramp assembly 10 is positioned in carriage 200, such can be referred to as a stored position of ramp assembly 10. In the stored position, support structure 22 is positioned adjacent or folded against the bottom surface of ramp 11 between side rail and proximate the end of ramp 11 with connection device 40. Furthermore, when ramp assembly 10 is substantially removed from carriage 200, it should be understood that ramp 11 is pivotally biased away from the support structure 22.

It should be understood that exemplary components of exemplary support structures 22 can be formed from any of a variety of materials such as plastics, thermoplastics, metals, metal alloys and any combination thereof. Exemplary metals or similar material include tin, iron, aluminum, magnesium, zinc and copper, and alloys of any one metal or any combination of the metals. The metals or similar material can be characterized as being ductile and/or malleable. Being ductile and malleable allows for the metal or similar material to be molded into various forms and hardened. Still other exemplary metals for support structures 22 include alloys of metal such as steel, stainless steel, brass and bronze.

Still another exemplary support structure 22 includes structure comprising plastic such as thermoplastic, thermosetting plastic and similar material. These plastic materials can be characterized as being ductile and/or malleable which provides the capability of being molded into various forms and hardened. Furthermore, these plastic materials can be generally characterized by any of various nonmetallic compounds, synthetically produced, usually from organic compounds by polymerization, or formed into pliable sheets or films, fibers, flexible or hard foams. Example plastic materials include polystyrene, acrylonitrile butadiene styrene (ABS), polyamide, polypropylene, polyethylene, and polyvinyl chloride (PVC). Other exemplary nonmetallic compounds include spun glass or fiberglass which is a composite of extremely fine fibers of glass combined with polymers and epoxies. It should further be understood that the materials selected for any one component of the support structure 22 would depend on the amount of stress and/or force (weight) that the one component would be expected to handle.

Exemplary methods of forming exemplary embodiments of support structure 22 include injection molding. Injection molding is a manufacturing process using thermoplastic and/or thermosetting plastic materials described previously in which to form the support structure 22 (example plastic materials include polystyrene, acrylonitrile butadiene styrene (ABS), polyamide, polypropylene, polyethylene, and polyvinyl chloride (PVC)). An overview of an injection molding process includes molten plastic being injected at high pressure into a mold wherein the mold is an inverse design of the shape of components of support structure 22. Still another exemplary method of forming support structure 22 includes die casting. Die casting is a manufacturing process using metals and/or metal alloys described previously in which to form the support structure 22 (example metals or metal alloys include tin, iron, aluminum, magnesium, zinc and copper, and alloys of any one metal or any combination of the metals). An overview of a die casting process includes molten metal being injected at high pressure into a mold wherein the mold is an inverse design of the shape of components of the support structure 22. Yet other exemplary methods of forming support structure 22 include: permanent mold casting, extrusion, forging, sand casting, powder metallurgy, ceramic mold casting, plaster mold casting and centrifugal casting.

Referring to FIG. 9, an exemplary support structure 22 includes a wheel frame 100 which is the one end of support structure 22 just described as being pivotally biased away from ramp 11. Opposite the one end is an end that includes an attachment frame 90 discussed more thoroughly subsequently. The exemplary wheel frame 100 is rectangular or square and includes a first cross member 103 spaced from a second cross member 101 by side members 102. The first cross member 103 includes a pair of wheels 104 positioned within the cross area defined by wheel frame 100 and shown in FIG. 16 being supported upon the carriage 200 at open end 192. The wheels 104 are laterally spaced on first cross member 103 and rotatably supported on respective axles 198. Axles 198 are supported in suspension arms 196 extending inwardly from first cross member 103 of wheel frame 100. Wheels 104 function to support one end of ramp assembly 10 and to allow ramp assembly 10 to be rolled in and out of carriage 200. Wheel frame 100 further includes a stop 105 between respective wheels 104. Stop 105 has one end pivotally secured to first cross member 103 by axle 109 and an opposite end formed as forked portion 114. The function of stop 105 will be described subsequently.

It should be understood that wheels 104 can have any width that fits between side member 102 and stop 105. For example, one embodiment of the invention will have a wheel 104 having a width that extends between side member 102 and stop 105 and which is appropriately termed a roller wheel 104. In other embodiments of the invention, any number of a plurality of wheels 104 will be provided between respective spaces defined by member 102 and stop 105.

Still referring to FIGS. 9-10, the exemplary support structure 22 further includes a pair of laterally spaced arms 97 pivotally secured to second cross member 101 of wheel frame 100. A pivoting axis for each arm 97 is perpendicular to the page and defined along pivot connections 111. Each arm 97 is a telescoping structure having a pair of concentric tubes slidingly engaging one another. One end of first tubes 99 is secured to second cross member 101 by pivot connections 111 and the other end of first tubes 99 slidingly engages respective second tubes 98. That is, the outside diameter of first tubes 99 is configured small enough to slide within the inside diameter of second tubes 98. One end of second tubes 98 slides over respective first tubes 99 and the other end of second tubes 98 (opposite first tubes 99) is rotationally secured to shaft 91. The pivoting or rotational axis of second tubes 98 is along shaft 91. In one embodiment of the invention, an exemplary outside diameter of first tube 99 is one inch (1.0 inch) and an exemplary inside diameter of second tube 98 is one and a quarter inch (1.25 inches). An exemplary range of outside diameters for first tube 99 includes about 0.25 inches to about 5 inches with the understanding that the dimensions of the inside diameter of second tube 98 accommodates the selected outside diameter for first tube 99.

In another exemplary embodiment of support structure, not shown, according to one of various embodiments of the invention is described. For this another exemplary embodiment of support structure, wheel frame 100 will only have first cross member 103 and will not include second cross member 101 nor side members 102. That is, for this another exemplary embodiment of support structure, the pair of laterally spaced telescoping arms 97 are pivotally secured to first cross member 103 of wheel frame 100 instead of second cross member 101. The pivoting axis for each telescoping arm 97 is perpendicular to the page and defined along pivot connections 111. It should be understood that suspension arms 196 with wheels 104 can be positioned more proximate stop 105 to allow the pivoting action of telescoping arms 97.

Still referring to FIGS. 9-10, the exemplary support structure 22 further includes the attachment frame 90 at the end of support structure 22 opposite wheel frame 100. Shaft 91 is secured to fork members 92 of the attachment frame 90. Shaft 91 can be rotationally secured to fork members 92 of the attachment frame 90 or affixed without the capability for rotation. Attachment frame 90 includes a crosspiece 93 laterally spacing fork members 92. Moreover, attachment frame 90 is releasably secured to ramp assembly 10 beneath ramp 11 adjacent the bottom surface between side rails 20. In one exemplary embodiment of the invention, fork members 92 are secured to side rails 20 by bolts (not shown). It should be understood that attachment frame 90 can be rotationally secured to ramp 11 or affixed without the capability for rotation.

Still referring to FIGS. 9-10, the exemplary support structure 22 further includes a cross pin 106 extending between respective second tubes 98 and generally parallel with second cross member 101 and crosspiece 93. At least one spring 94 is axially positioned on shaft 91 with one end to be biased against ramp 11 (lower surface 13) and the other end biased against cross pin 106. In another embodiment of the invention, the spring(s) 94 will have one end biased against crosspiece 93 and the other end biased against cross pin 106. In this configuration of spring 94 with attachment frame 90 secured to ramp assembly 10, the wheel frame 100 is biased away from the bottom surface of ramp 11 with arms 97 rotating on shaft 91. One or more spacers (not shown) can be positioned on shaft 91 between respective springs 94, between springs 94 and second tubes 98, and between second tubes 98 and respective fork portions 92. Referring to FIG. 10, a pair of bolts 122 is illustrated extending through fork member 92 relative opposites sides of exposed end of shaft 91. It should be understood that bolts 122 extend through both fork members 92 and are used to secure support structure 22 onto ramp 11 through side rails 20 adjacent the lower surface 13.

In one embodiment of the invention, support structure 22 includes a plurality of springs 94, for example, three springs 94. An exemplary total biasing force provided by the total number of springs 94, whether one spring 94 or a plurality of springs 94, is approximately 30 lbs. (pounds). That is, the lifting force needed to lift the first end 14 of ramp 11 with connection device 40 is 30 pounds less than would be needed otherwise without spring(s) 94. Other exemplary total biasing forces according to various embodiments of the invention include about 10 lbs., about 15 lbs., about 20 lbs., about 25 lbs., about 30 lbs., about 35 lbs., about 40 lbs., about 45 lbs., about 50 lbs. For another exemplary embodiment of the invention, a range of exemplary total biasing force(s) provided by the total number of spring(s) 94, whether one spring 94 or a plurality of springs 94, is approximately 75 lbs. to about 110 lbs. For still another exemplary embodiment of the invention, a range of exemplary total biasing force(s) provided by the total number of spring(s) 94, whether one spring 94 or a plurality of springs 94, is approximately 85 lbs. to about 100 lbs. Yet for another exemplary embodiment of the invention, a range of exemplary total biasing force(s) provided by the total number of springs 94, whether one spring 94 or a plurality of springs 94, is approximately 85 lbs. to about 100 lbs. with one exemplary total biasing force being 90 lbs. That is, the lifting force needed to lift the first end 14 of ramp 11 with connection device 40 is 90 pounds less than would be needed otherwise without spring(s) 94.

It should be understood that various embodiments of the invention include the support structure 22 to have one spring only, or two springs only, or any of a plurality of springs of three or more. It should also be understood that if more than one spring is included, then each spring can have the same biasing force. Alternatively, if more than one spring is included, each spring can have a different, or the same, biasing force or any combination of various different, or the same, biasing forces. For example, at least one spring can have a biasing force different from other springs while at least two of the other springs have the same biasing forces. Another example, at least one spring can have a biasing force the same as another spring while at least one other spring has a different biasing forces. It should be further understood, particularly referring to FIG. 9, support structure 22 further includes a pair of connection cords 107 each having opposite ends. One end of each connection cord 107 is secured to a respective first tube 99 and the other end of each connection cord 107 is secured to the cross pin 106. Additionally, a pair of springs 108 extend between the pair of the connection cords 107 wherein the pair of springs 108 bias each connection cord 107 toward the other which effectively biases the second tube 98 over the first tube 99 toward the second cross member 101.

Figure 11:
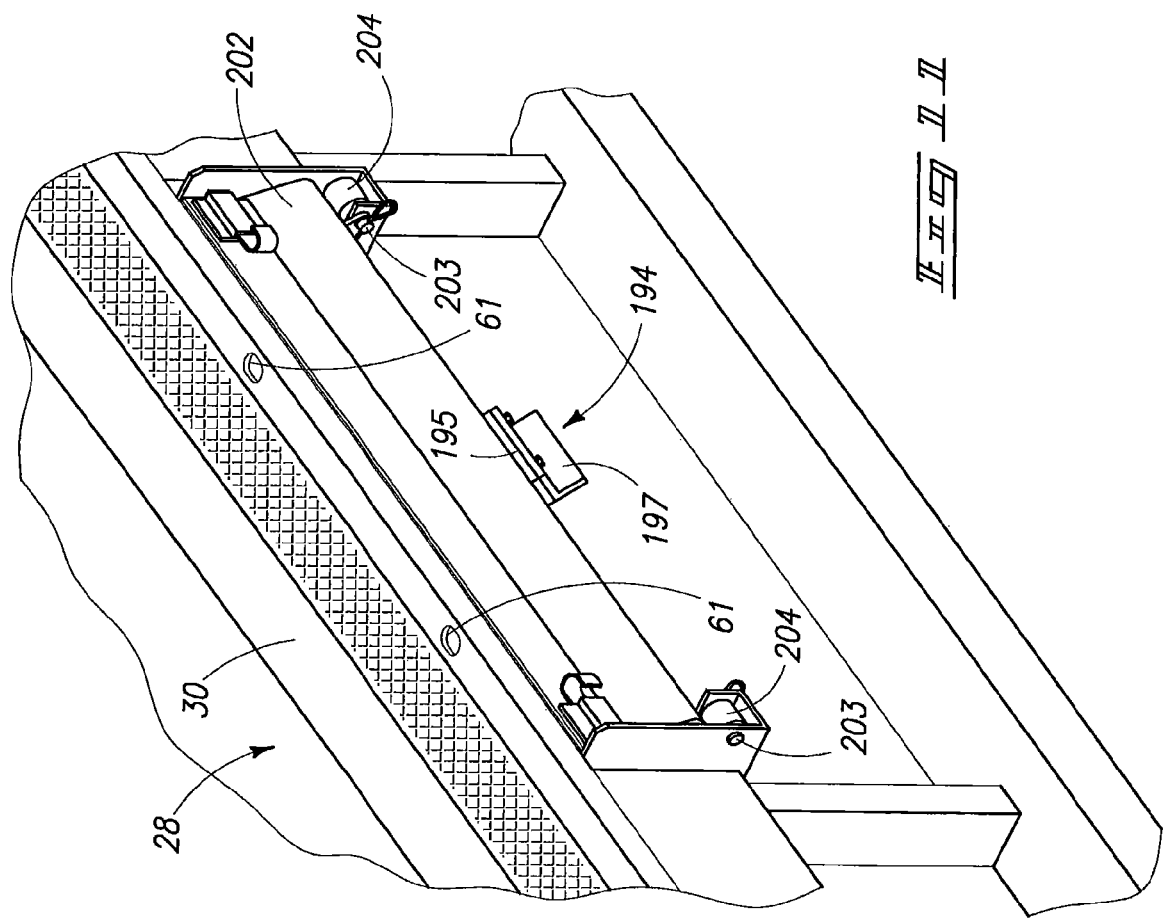
FIG. 11 is a perspective view of a carriage cover according to one of various embodiments of the invention.
Figure 12:
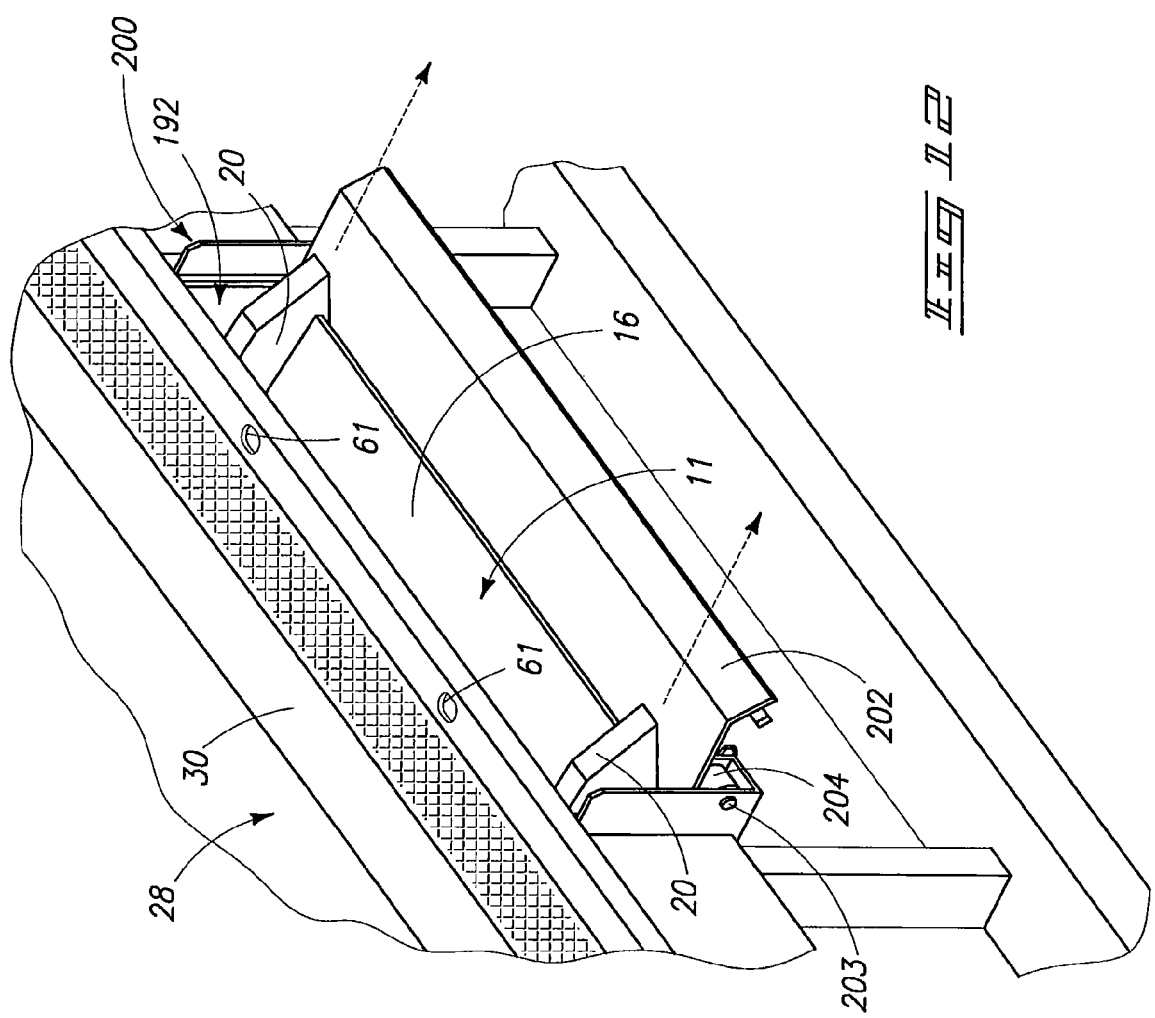
FIG. 12 is a perspective view of the carriage cover of FIG. 11 in an open position according to one of various embodiments of the invention.

Referring to FIGS. 11-12, an exemplary door 202 is illustrated that covers open end 192 of carriage 200. Door 202 is pivotably secured to carriage 200 on axles 203 at the rear of vehicle 26 and rollers 204 are rotatably secured on axles 203. The rollers 204 and axles 203 are located at lateral sides of carriage 200 and door 202. One exemplary embodiment of door 202 includes a catch 194 secured to the lower exterior portion of door 202. An exemplary catch 194 is configured as two right-angled plates with a securement plate 195 angled relative a contact plate 197. Securement plate 195 is for removably securing catch 194 to door 202 and the function of contact plate 197 is to impede ramp assembly 10 from completely exiting carriage 200 discussed more thoroughly below.

Referring to FIG. 12, door 202 is pivoted on axles 203 to uncover open end 192 of carriage 200 and exposing ramp 11 of ramp assembly 10. One exemplary embodiment of door 202 provides for door 202 to remain in this open position by the effects of gravity. In the open position, door 202 and catch 194 have pivoted approximately 90° leaving the contact plate 197 (not shown in FIG. 12) facing the open end 192 of carriage 200. During maneuvering of ramp assembly 10 back and forth along the length of the carriage 200, the stop 105 rests upon and slides across the bottom surface of the carriage 200. When pulling ramp assembly 10 from carriage 200, the stop 105 will slide along the bottom surface of the carriage 200 until it reaches the end of carriage 200 wherein stop 105 will pivot or drop downward elevationally below the bottom surface of the carriage 200 by the force of gravity.

Consider door 202 of vehicle 26 having been pivoted in the open position shown in FIG. 12 and assume ramp assembly 10 has been pulled from carriage 200 until forked portion 114 of stop 105 has dropped (pivoted) below the bottom surface of the carriage 200. In this orientation and referring to FIG. 16, as ramp assembly 10 continues to be pulled from (retracted or withdrawn from) carriage 200 until stop 105 traverses the small distance from the end of carriage 200 to door 202. Once the small distance is traversed, the contact plate 197 of catch 194 will engage the apex of forked portion 114 of stop 105 as illustrated. In this manner, the motion of ramp assembly 10 will cease preventing ramp assembly 10 from disengaging from carriage 200. Particularly, a portion of wheel frame 100 of support structure 22 remains in carriage 200. Moreover, catch 194 engaging stop 105 facilitates the positioning of ramp 11 in a beneficial location relative vehicle 26 for subsequent maneuvering of ramp 11 relative cargo bed 28 with ease, simplicity and efficiency.

Referring to FIGS. 13-25, an exemplary method 230 of loading and unloading a vehicle is described according to one of various embodiments of the invention.

Referring to FIG. 25, method 230 includes an exemplary step 231 of providing a ramp according to one embodiment of the invention.

Referring to FIGS. 13-17, step 231 is shown being implemented according to one of various embodiments of the invention. It should be understood that vehicle 26 is stopped and cargo door to cargo area may, or may not, be opened at this stage. Carriage door 202 is opened to gain access to ramp 11 of ramp assembly 10. It should be further understood that ramp 11 is manipulated at second end 16 by a person 233 (shown in FIG. 19).

Figure 13:
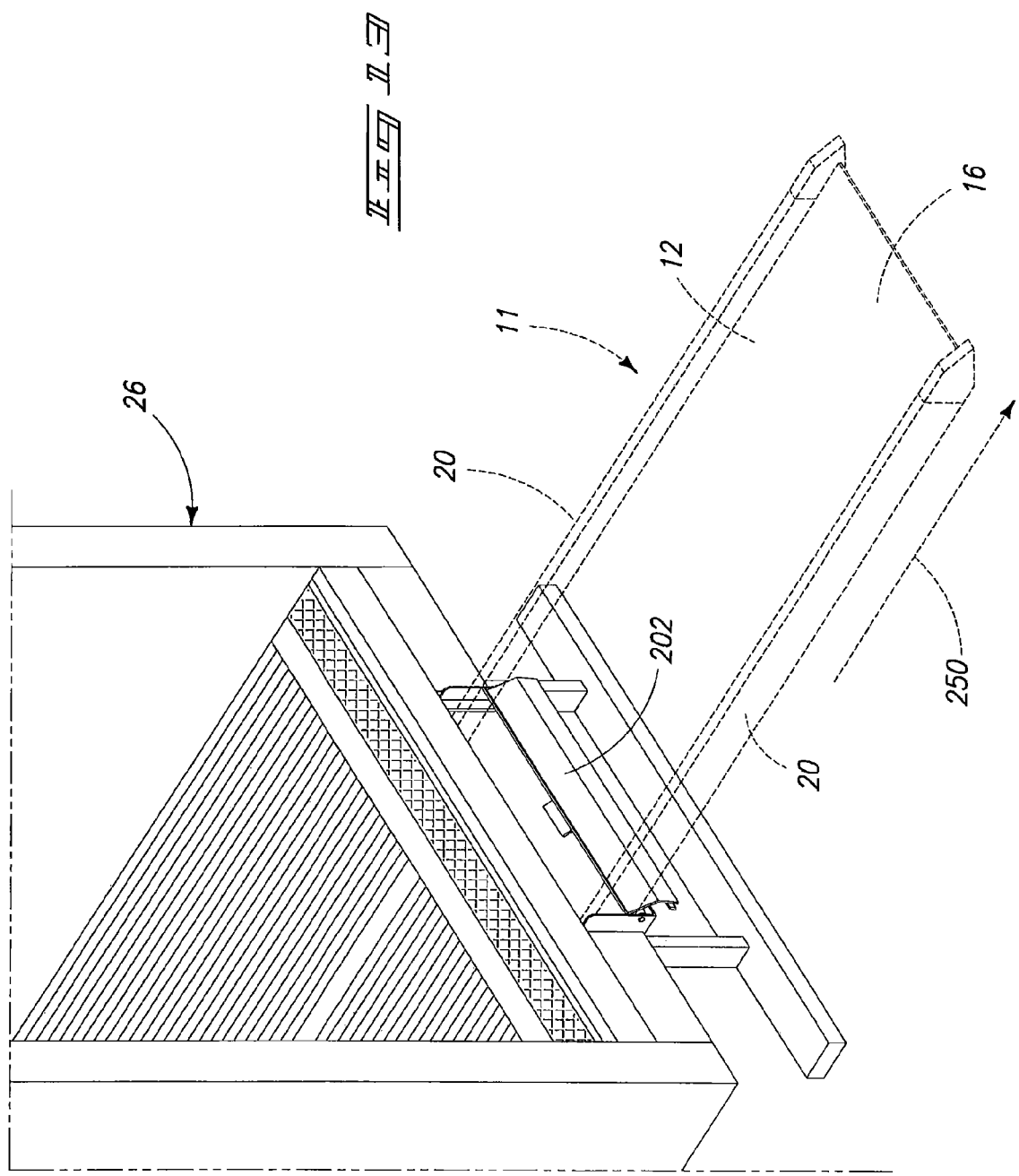
FIG. 13 is a partial perspective view of a step of a method for loading and unloading a vehicle according to one of various embodiments of the invention.

Referring to FIG. 13, ramp assembly 10 is pulled along direction 250 from carriage 200 as person 233 walks generally backwardly from vehicle 26. In this manner, ramp assembly 10 is being withdrawn from carriage 200. In one exemplary embodiment of the invention, person 233 maintains second end 16 of ramp assembly 10 generally at waist level during the withdrawal.

Figure 14:
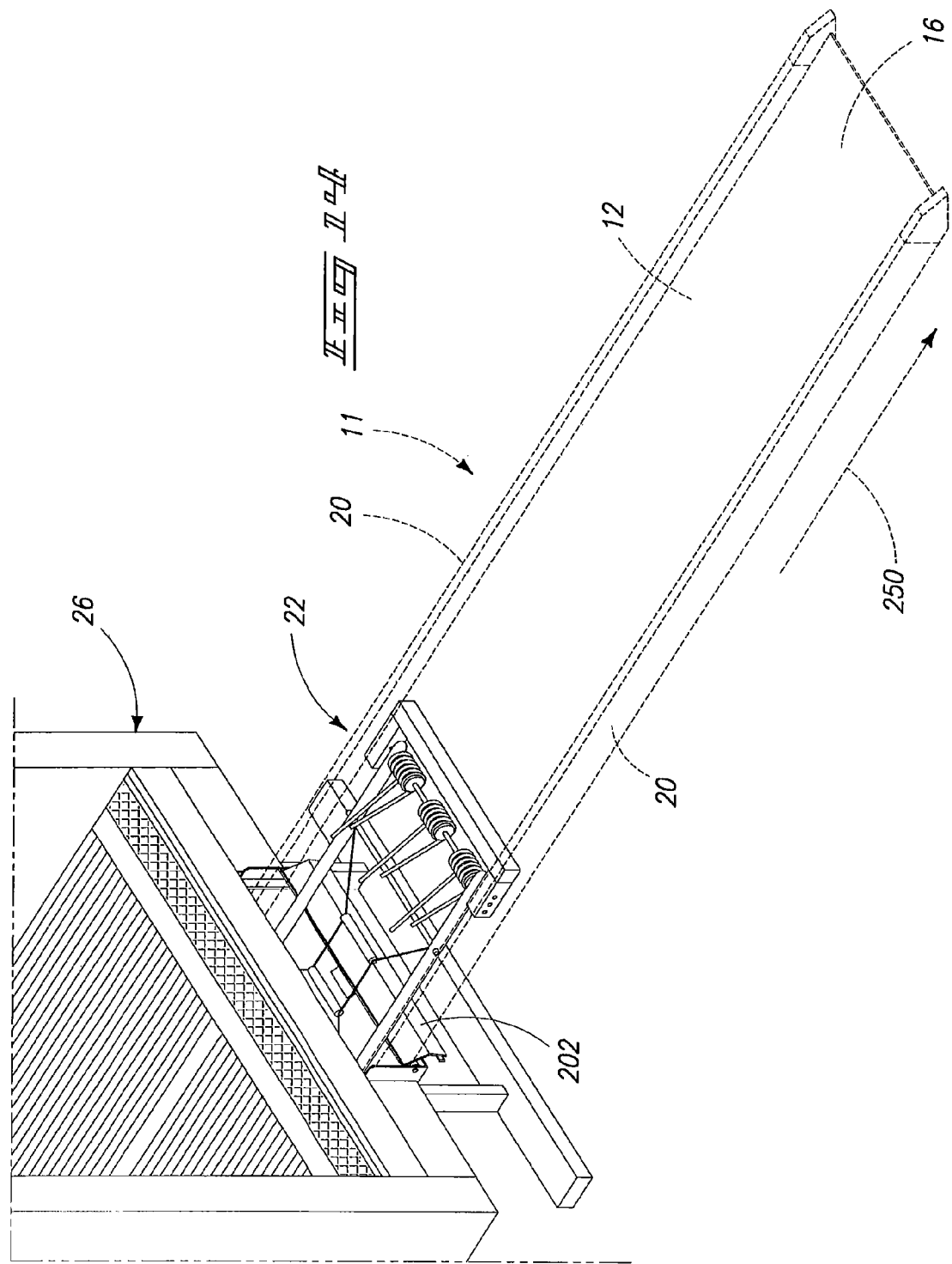
FIG. 14 is a partial perspective view of another step of a method for loading and unloading a vehicle according to one of various embodiments of the invention.

Referring to FIG. 14, person 233 (not shown) continues to walk backwardly while pulling on ramp assembly 10 along direction 250 and support structure 22 is being shown to begin exiting carriage 200 through open end 192.

Figure 15:
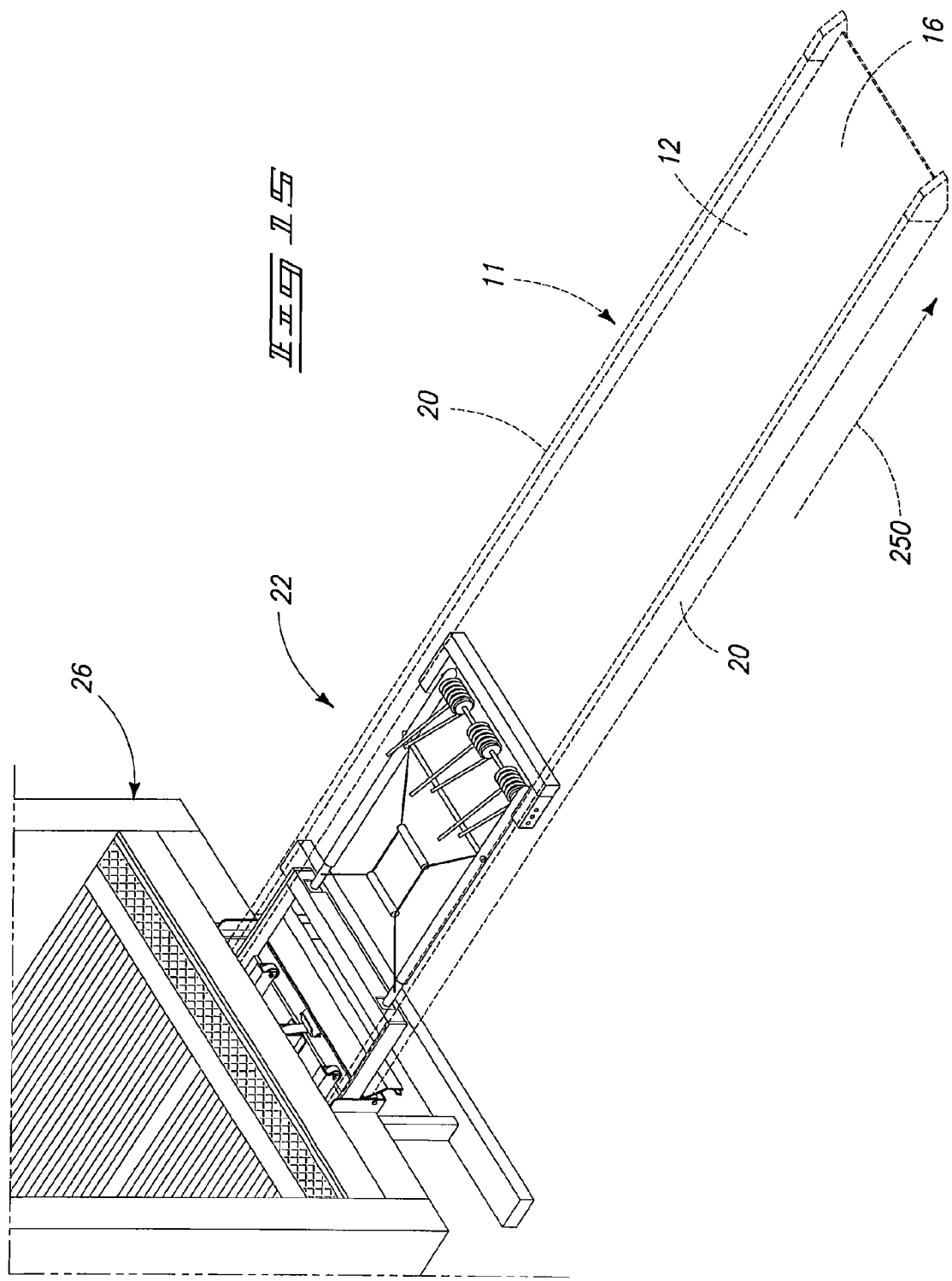
FIG. 15 is a partial perspective view of another step of a method for loading and unloading a vehicle according to one of various embodiments of the invention.

Referring to FIG. 15, person 233 (not shown) continues to walk backwardly while pulling on ramp assembly 10 along direction 250 until stop 105 engages catch 194 of carriage door 202. In this orientation of ramp assembly 10, connection device 40 is in the closed or folded position described previously maintained in that position by lock 61.

Figure 16:
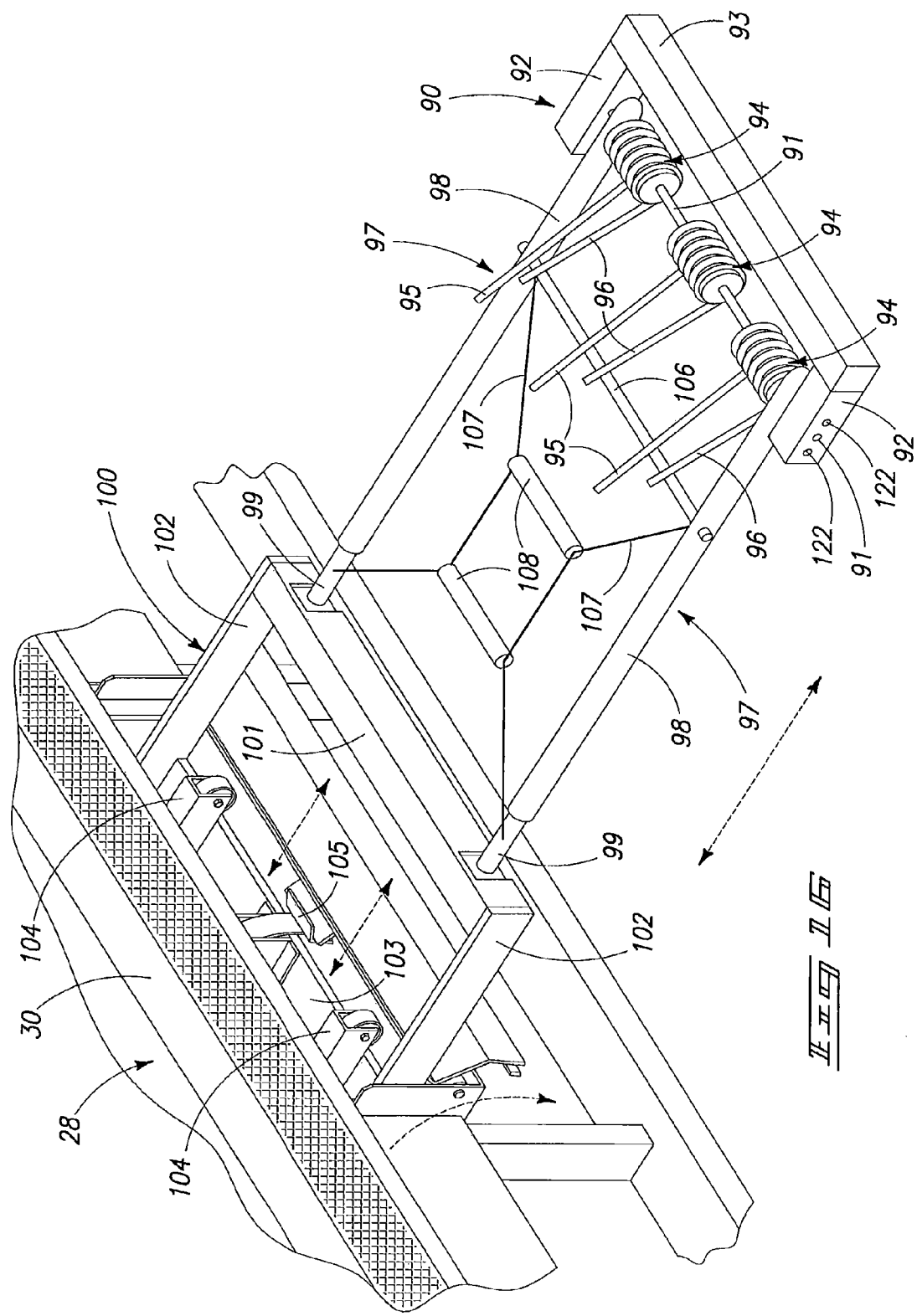
FIG. 16 is a partial perspective view of the support structure of FIG. 9 in use during a method for loading and unloading a vehicle according to one of various embodiments of the invention.

Referring to FIG. 16, a more thorough illustration of stop 105 engaging catch 194 is shown with the understanding ramp 11 is removed for simplicity. Once stop 105 engages catch 194, ramp assembly 10 ceases being withdrawn from carriage 200. Moreover, stop 105 engages catch 194 and beneficially positions ramp 11 to facilitate manipulation of connection device 40 relative the cargo area of vehicle 26.

Figure 17:
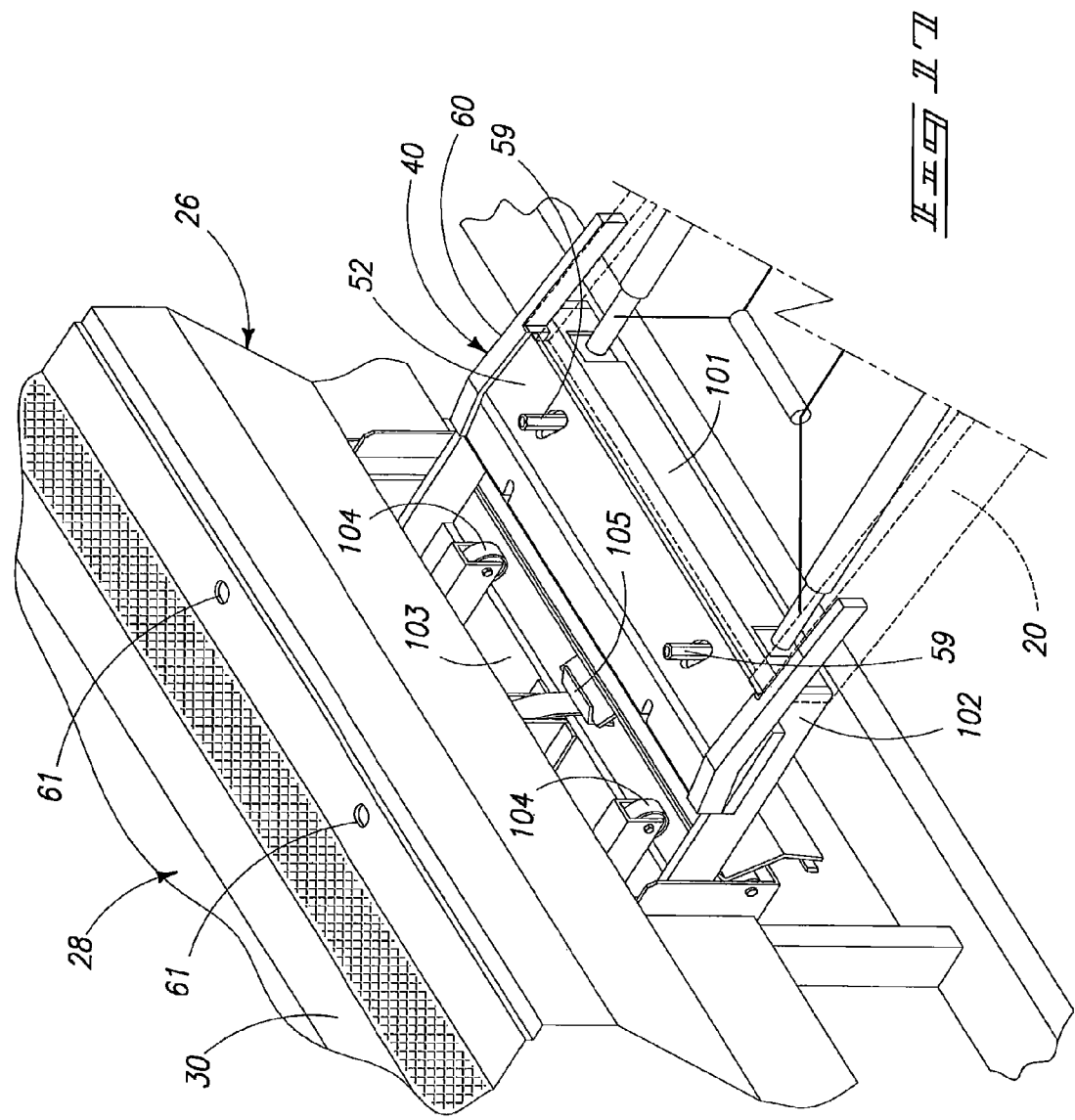
FIG. 17 is a partial perspective view of another step of a method for loading and unloading a vehicle according to one of various embodiments of the invention.

For example, referring to FIG. 17, connection device 40 and first end 14 of ramp 11 are supported upon support structure 22 slightly outward of carriage 200 and slightly outward of rearmost portion 30 of vehicle 26. Connection device 40 is in the folded position.

Again referring to FIG. 25, another exemplary step 232 of method 230 according to an embodiment of the invention includes pivotably securing an end of the ramp to a vehicle.

Figure 18:
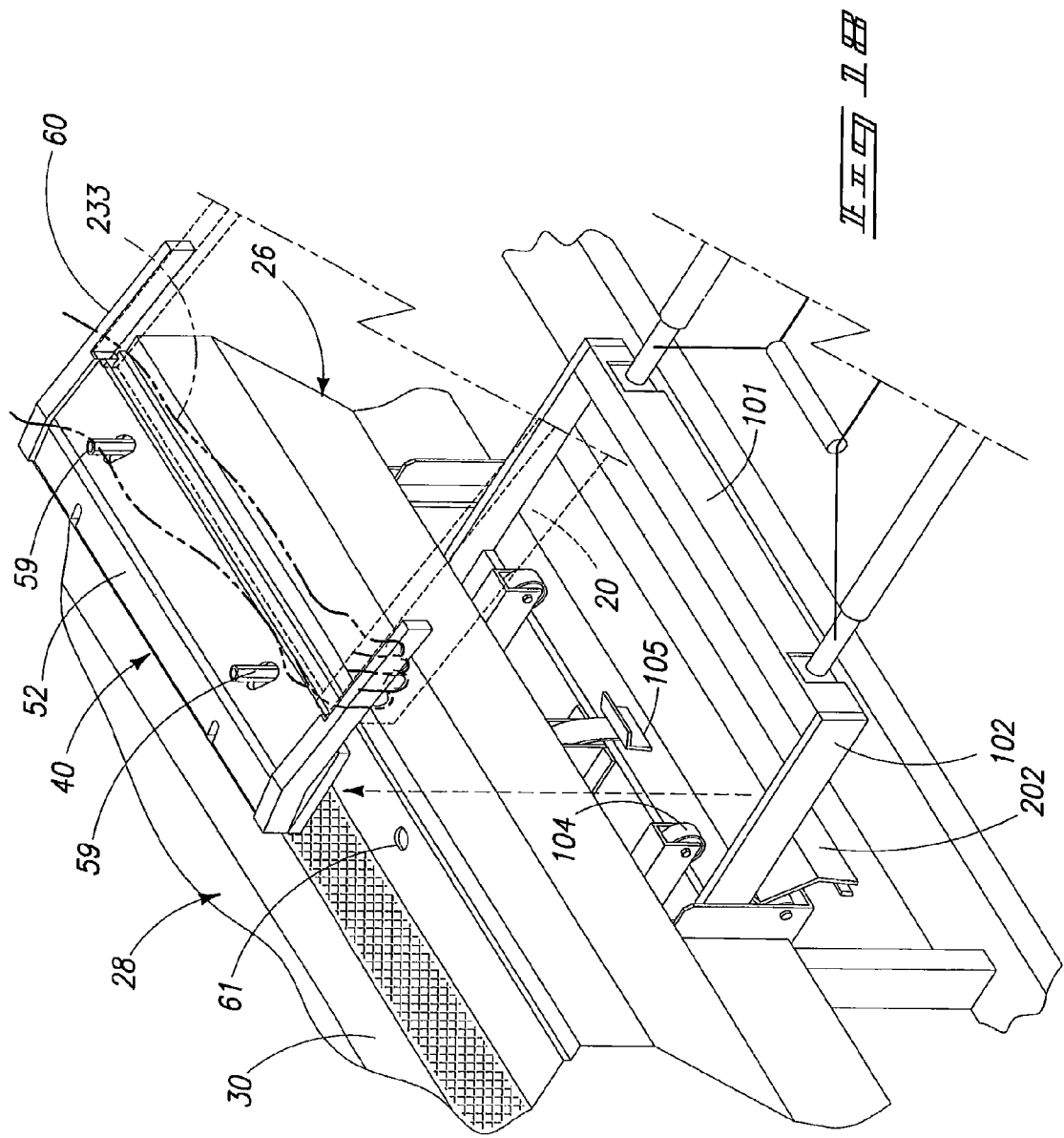
FIG. 18 is a partial perspective view of another step of a method for loading and unloading a vehicle according to one of various embodiments of the invention.
Figure 19:
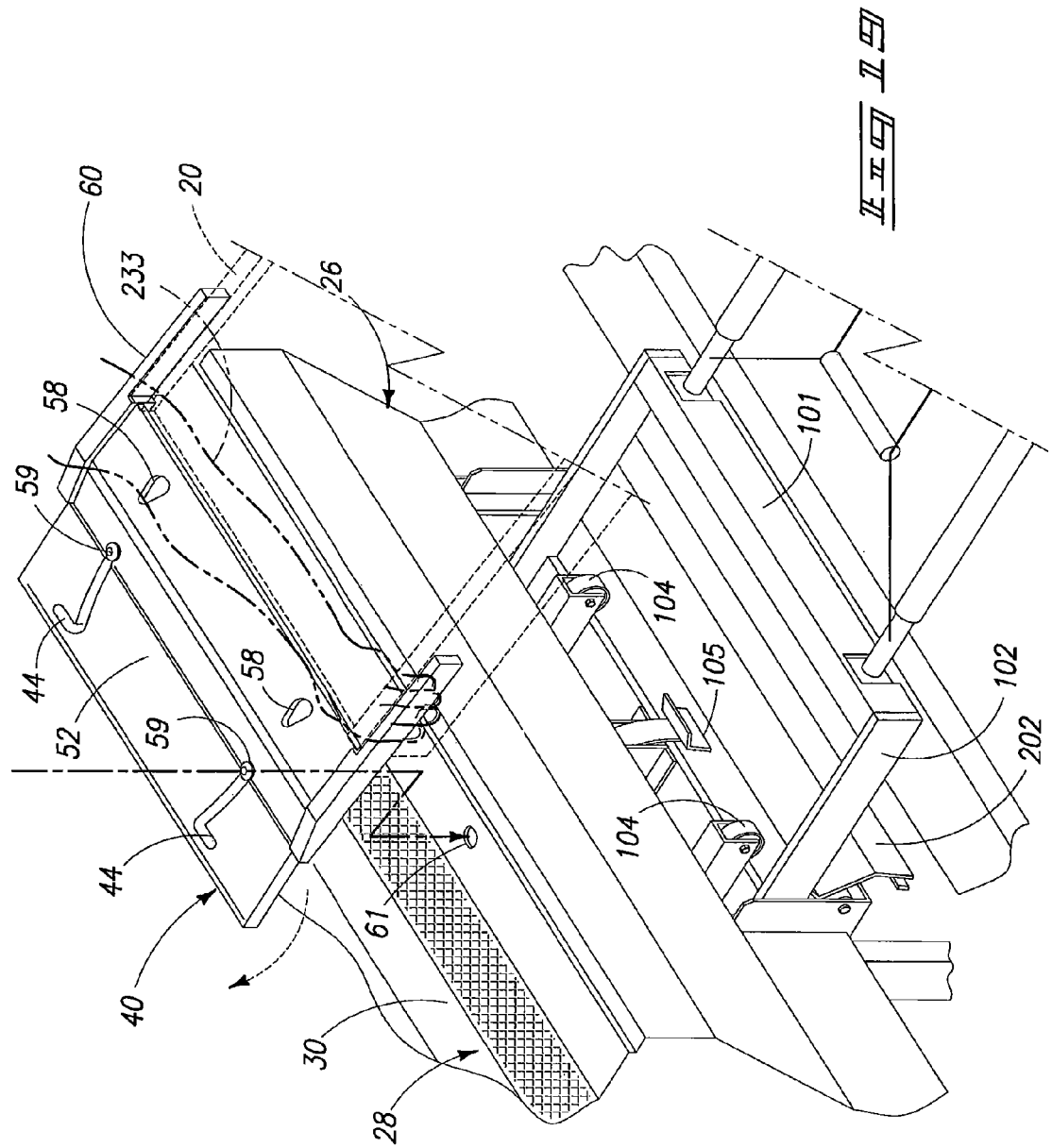
FIG. 19 is a partial perspective view of another step of a method for loading and unloading a vehicle according to one of various embodiments of the invention.
Figure 20:
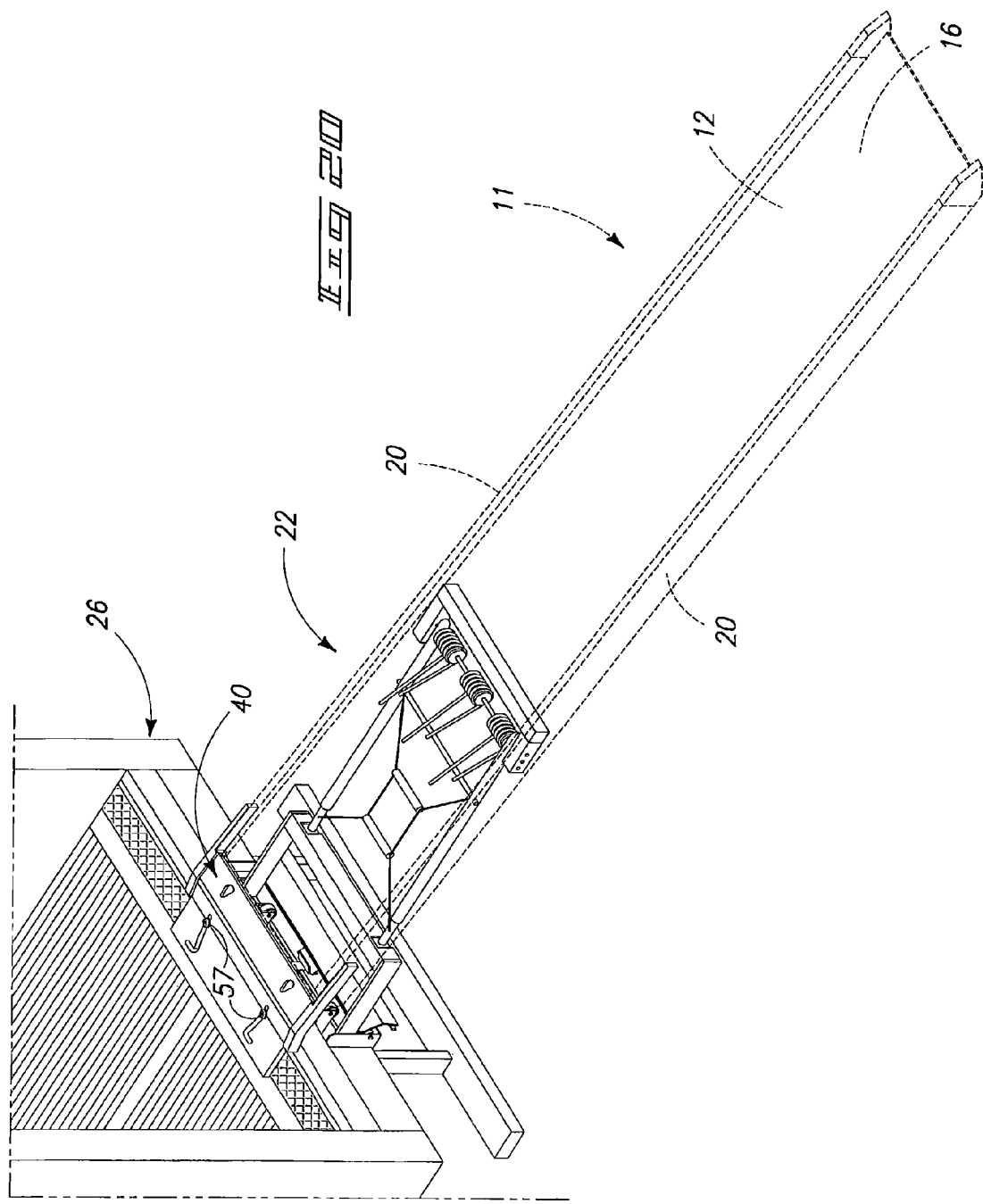
FIG. 20 is a perspective view of another step of a method for loading and unloading a vehicle according to one of various embodiments of the invention.

Referring to FIGS. 18-20, an exemplary step 232 is shown being implemented according to one of various embodiments of the invention. Referring to FIG. 18, person 233 lifts the first end 14 of ramp 11 with connection device 40 away from support structure 22. In one embodiment of the invention, step 232 further includes lifting the first end 14 of ramp 11 with connection device 40 to be proximate and elevationally above rearmost portion 30 of cargo bed 28. It should be understood that lifting of first end 14 of ramp 11 and connection device 40 is greatly facilitated by the biasing force of springs 94 of support structure 22.

Referring to FIG. 19, an exemplary step 232 further includes holding the first end 14 of ramp 11 and unlocking connection device 40 from the folded position by turning or rotating the finger 67 of lock 61 away from beneath guide bracket 42. This action on lock 61 will allow the unfolding of connection device 40 by pivoting guide bracket 42 approximately 180° from beneath ramp bracket 52. In the unfolded position, guide bracket 42 extends from ramp bracket 52 over rearmost portion 30 of cargo bed 28. Furthermore, guide pins 57 are to be aligned for receipt in openings 61 in rearmost portion 30 of cargo bed 28.

Referring to FIG. 20, an exemplary step 232 further includes lowering first end 14 of ramp 11 and connection device 40 to allow receipt of guide pins 57 in openings 61 of rearmost portion 30 of vehicle 26. In this orientation, ramp 11 of ramp assembly 10 is pivotably connected with vehicle 26 with second end 16 supported on a substrate exterior of cargo bed 28. An exemplary substrate exterior of cargo bed 28 includes pavement of a street.

Again referring to FIG. 25, another exemplary step 234 of method 230 according to an embodiment of the invention includes pivoting the ramp to a side of the vehicle.

Figure 21:
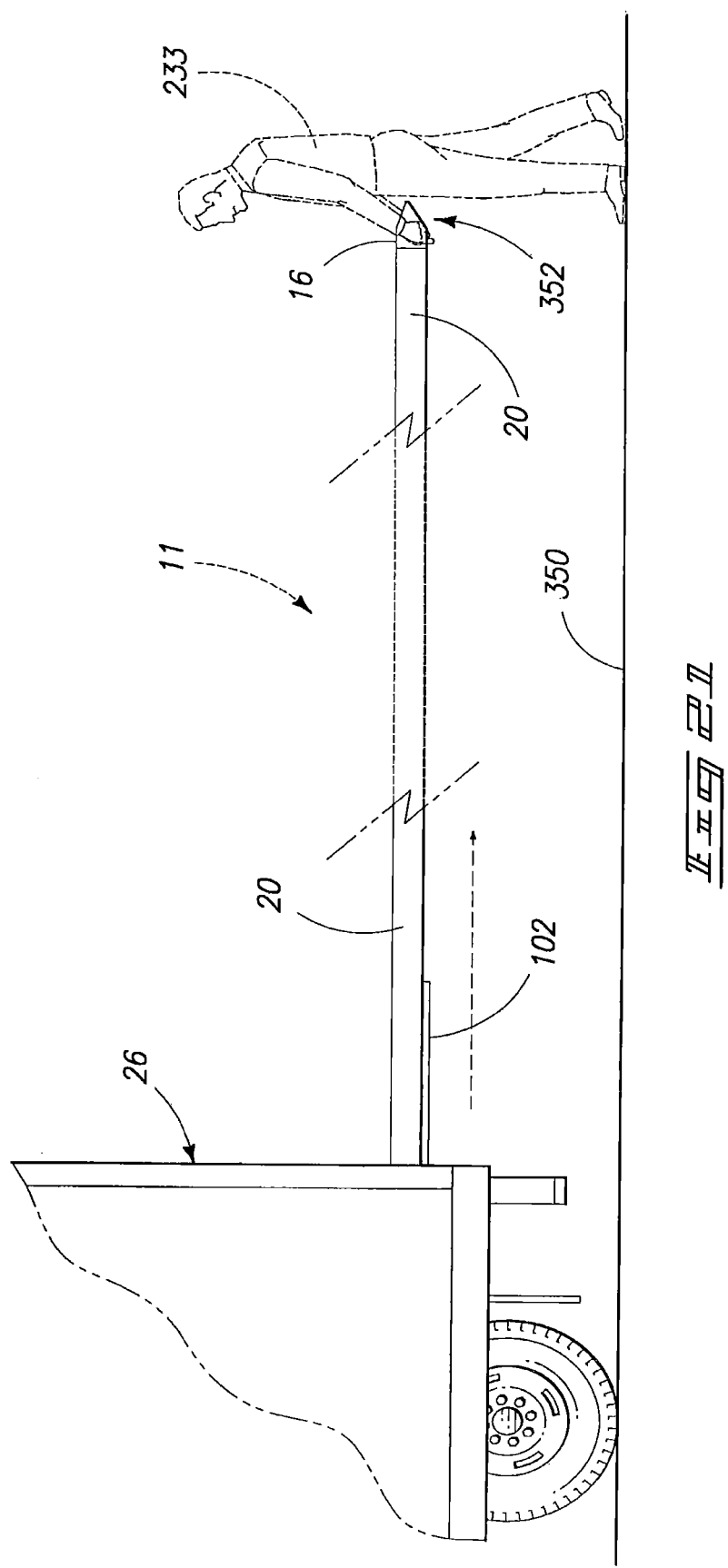
FIG. 21 is a side view of another step of a method for loading and unloading a vehicle according to one of various embodiments of the invention.

Referring to FIGS. 21-24, an exemplary step 234 is shown being implemented according to one of various embodiments of the invention. Referring to FIG. 21, person 233 lifts second end 16 of ramp 11 in direction 352 from pavement 350.

Figure 22:
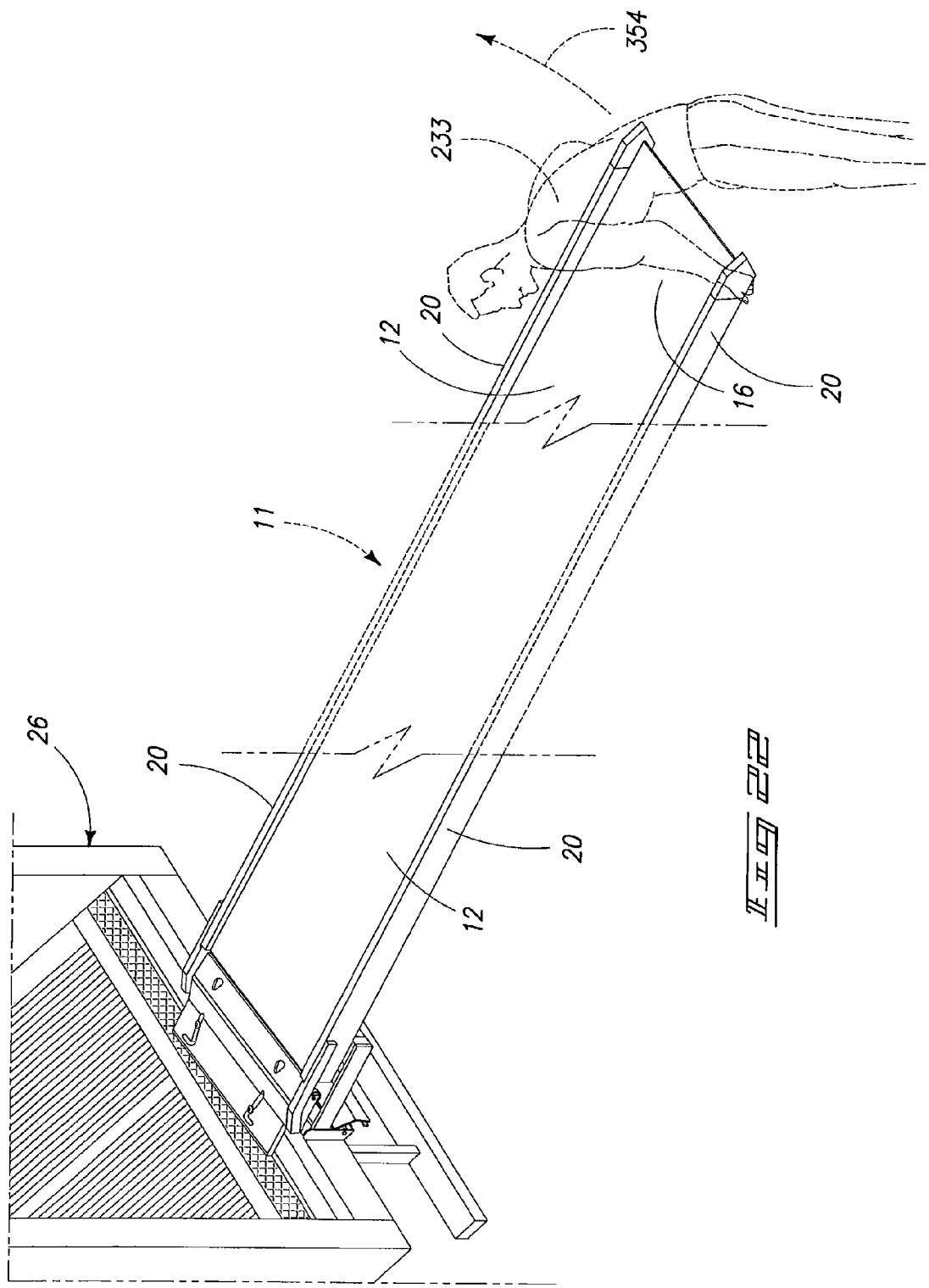
FIG. 22 is a perspective view of another step of a method for loading and unloading a vehicle according to one of various embodiments of the invention.

Referring to FIG. 22, an exemplary step 234 further includes person 233 pivoting second end 16 of ramp 11 in direction 354 toward a substrate along the side of vehicle 26. An exemplary side substrate includes a sidewalk adjacent and elevationally above pavement 350 of the street.

Figure 23:
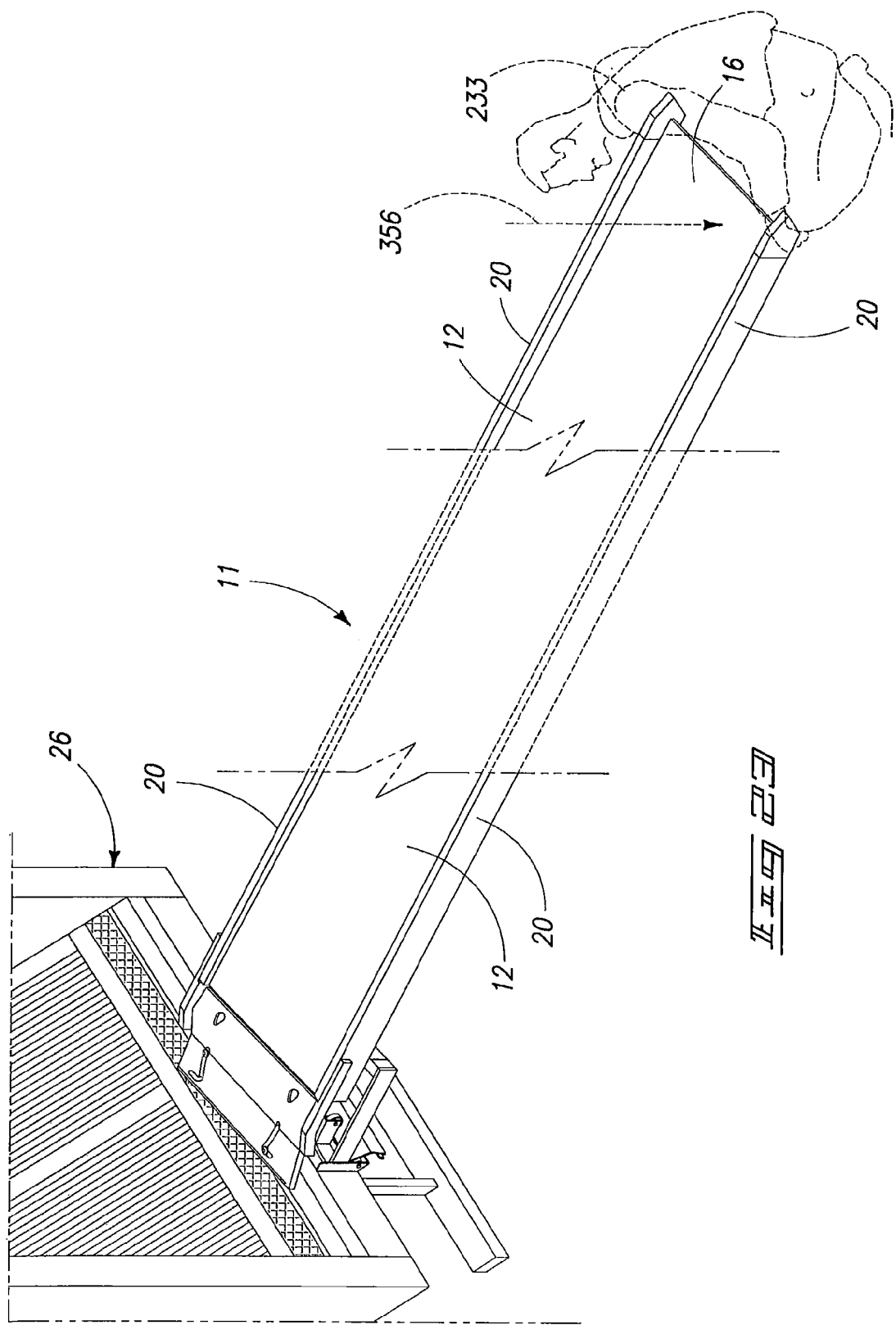
FIG. 23 is a perspective view of another step of a method for loading and unloading a vehicle according to one of various embodiments of the invention.
Figure 24:
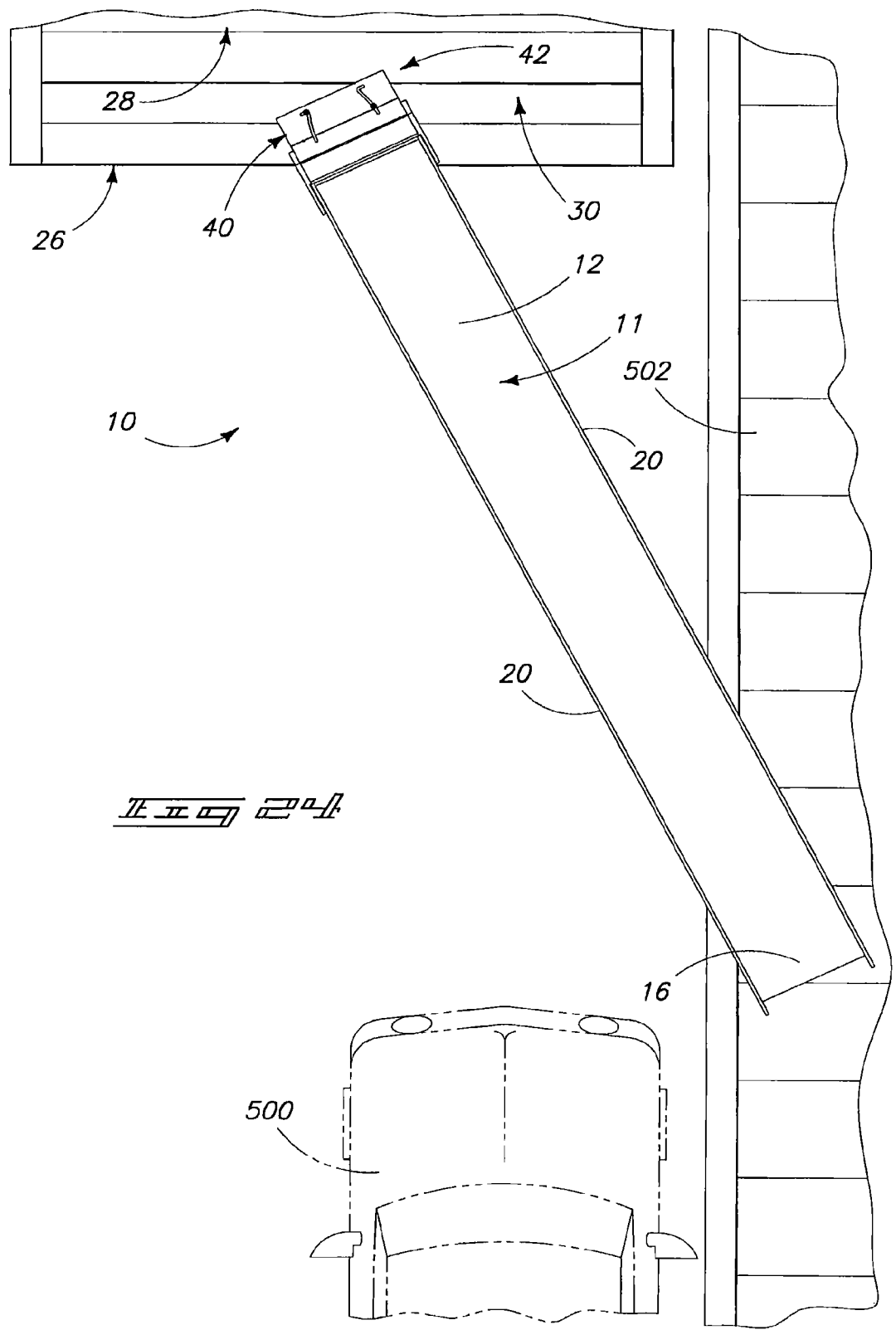
FIG. 24 is a plan view of another step of a method for loading and unloading a vehicle according to one of various embodiments of the invention.

Referring to FIG. 23, an exemplary step 234 further includes person 233 lowering the first end 16 of ramp 11 along direction 356 to allow first end 16 to rest upon sidewalk 502 (see FIG. 24).

Referring to FIG. 24, a top view of ramp assembly 10 is illustrated after an exemplary step 234 is performed. Ramp 11 has first end 14 pivotably secured to rearmost 30 of vehicle 26 and second end 16 is pivoted to a side of vehicle 26 and cargo bed 28 to rest upon sidewalk 502. Another vehicle 500 is parked behind ramp assembly 10 and vehicle 26. There has been a long felt need in the ramp industry, and in the industry for loading/unloading of vehicles, to provide for the capability of pivoting a ramp 11 relative a cargo bed 28 or area of a vehicle. Moreover, there has been a long felt need in the ramp industry, and in the industry for loading/unloading of vehicles, to provide the first end 14 of ramp 11 to be level with the cargo bed 28 after the pivoting. Furthermore, there has been a long felt need in the ramp industry, and in the industry for loading/unloading of vehicles, to provide for the second end 16 of ramp 11 to be level upon the exterior surface outside the cargo bed 28 after the pivoting. The various inventive embodiments of ramp assemblies 10 described herein provide these capabilities and resolve these long felt needs.

Exemplary ranges of pivoting angles for ramp assembly 10 according to various embodiments of the invention are now discussed. However, first it must be understood that ramp 11 is positioned at the beginning to extend straight back from the cargo bed 28 of vehicle 26 wherein the length dimension of ramp 11 is aligned, or parallel with, the length dimension of vehicle 26 (for example, see FIG. 8). This position of ramp 11 will be referred to as the 0 degree position. Second, our next consideration must be the length dimension of ramp 11. Our first discussion will start with ramps 11 having a length of about 10 feet to about 12 feet. Looking at ramp assembly 10 from the perspective of FIG. 8 at the 0 degree position, ramp 11 can be pivoted along direction 76 for a range from the 0 degree position to about 70 degrees to the right. Alternatively, ramp 11 can be pivoted along direction 77 for a range from the 0 degree position to about 70 degrees to the left. Consequently, for the two directions 76 and 77 and with ramp 11 having a length of about 10 feet to about 12 feet, the inventive ramp assembly 10 has a total range of a pivoting angle of about 140 degrees (70 degrees+70 degrees).

Our second discussion is with a ramp 11 having a length of about 14 feet to about 17 feet. Ramp 11 can be pivoted along direction 76 for a range from the 0 degree position to about 55 degrees to the right. Alternatively, ramp 11 can be pivoted along direction 77 for a range from the 0 degree position to about 55 degrees to the left. Consequently, for the two directions 76 and 77 and with ramp 11 having a length of about 14 feet to about 17 feet, the inventive ramp assembly 10 has a total range of a pivoting angle of about 110 degrees (55 degrees+55 degrees).

It should be understood that the inventive ramp assembly 10 can be configured with any length of ramp 11 to have a pivoting angle range of about 180 degrees. To provide this capability of a pivoting angle range, the connection device would have to be modified. For example, in one exemplary embodiment of inventive ramp assembly 10, the length dimensions of guide slots 44 would have to be modified to accommodate the range of the pivoting motion of ramp 11.

Again referring to FIG. 25, another exemplary step 235 of method 230 according to an embodiment of the invention includes loading or unloading cargo from the vehicle along the ramp. An exemplary loading and unloading cargo includes using a transport device (not shown) such as a dolly to move cargo from the vehicle 26. With ramp 11 pivoted to rest upon sidewalk 502, cargo from the cargo bed 28 of vehicle 26 can move directly from the vehicle 26 to the sidewalk 502. Consequently, several inefficient, time consuming and arduous steps are avoided. That is, the cargo via a dolly is first moved down the ramp. However, the cargo is not first moved onto the street, the dolly is not rotated to be square with the curb, and finally, the dolly is not lifted several inches from the street to the sidewalk. In fact, depending on the weight of the cargo on the dolly, this last step of lifting the cargo may be impossible. In contrast, all three of the last described steps are unnecessary due the cargo being transported directly from the vehicle 26 to the sidewalk 502. Accordingly, with the inventive ramp assembly 10, the capabilities and functionality of ramps are increased. Moreover, the ease, simplicity and efficiency of using a ramp are increased. Still further, the stability of a ramp during use is increased since ramps that are not designed to be pivoted are continually pivoted by persons not familiar with the instability of pivoting such ramps not designed for such. Therefore, with increased stability comes increase in safety. Logically, the inventive ramp assemblies disclosed throughout this document increase and facilitate the ease, simplicity and efficiency of unloading and loading a vehicle.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A pivot device to pivotally secure a ramp to another structure, the pivot device comprising:
   a support plate configured to be secured to a ramp, the support plate having a first opening spaced from a second opening;
   a first pin extending through the first opening in the support plate;
   a second pin extending through the second opening in the support plate; and
   wherein the support plate comprises:
      a first plate having the first and second openings; and
      a second plate configured to be secured to the ramp, and the first plate configured to be folded beneath the second plate with portions of first and second pins extending through respective openings in the second plate.

2. The pivot device of claim 1 wherein at least one of the first and second openings comprises a slot configuration extending through the support plate and having a length dimension that extends generally perpendicularly relative to a longitudinal length of the first and second pins.

3. The pivot device of claim 1 wherein both of the first and second openings comprise a slot configuration extending through the support plate and having a length dimension that extends generally perpendicularly relative to a longitudinal length of the first and second pins.

4. The pivot device of claim 1 wherein the support plate comprises:
   a retaining device configured to maintain the first plate folded beneath the second plate.

5. The pivot device of claim 1 wherein the first plate of the support plate comprises a planar structure, and wherein at least one of the first and second openings comprises a slot extending through the support plate and having a curved configuration defined in the plane of the support plate.

6. The pivot device of claim 1 wherein the first plate of the support plate comprises a planar structure, and wherein at least one of the first and second openings comprises a slot extending through the support plate and having two configurations, a curved configuration defined in the plane of the support plate and a linear configuration extending from an end of the curved configuration.

7. The pivot device of claim 1 wherein the second plate comprises a portion of at least one of the first and second openings.

8. The pivot device of claim 1 wherein the second plate comprises a first planar portion angled with a second planar portion.

9. The pivot device of claim 1 wherein the second plate comprises sidewalls, the sidewalls are configured to provide the securement to the ramp.

10. The pivot device of claim 1 wherein at least one of the respective openings in the second plate comprise a tear-drop shape.

11. A pivot device configured to pivotally secure a ramp to a cargo bed, the pivot device comprising:
 a support plate comprising a thickness and having a first end opposite a second end, the second end configured to be secured to a ramp and the first end configured to be resting upon the cargo bed, the support plate comprising a first slot spaced from a second slot, each slot having a depth dimension that extends entirely through the thickness of the support plate;
 a first pivot pin and a second pivot pin, each pivot pin to extend entirely through the support plate via the respective first second slots, each pivot pin comprising an end resting in an opening in the cargo bed; and
 wherein the support plate comprises:
  a first plate having the first end and the first and second slots; and
  a second plate having the second end, the first plate configured to be folded beneath the second plate with portions of first and second pivot pins extending through respective openings in the second plate.

12. The pivot device of claim 11 wherein at least one of the first and second slots comprises a shape configuration that extends perpendicularly to the depth dimension and extends partially through the support plate.

13. The pivot device of claim 12 wherein the shape configuration of the at least one slot comprises at least two different shape configurations.

14. The pivot device of claim 12 wherein the shape configuration of the at least one slot comprises a curve.

15. The pivot device of claim 12 wherein the shape configuration of the at least one slot comprises a first shape that is a curve and a second shape that is a line extending from an end of the curve.

16. The pivot device of claim 11 wherein the second slot and the first slot both comprise the same shape configuration.

17. The pivot device of claim 11 wherein the second slot and the first slot both comprise the same shape configuration, and wherein the second slot and the first slot both comprise orientations in a plane of the support plate that are different from each other.

18. The pivot device of claim 11 wherein the second slot and the first slot both comprise the same shape configuration and the same dimensions for the shape configuration.

19. The pivot device of claim 11 further comprising a retaining device configured to maintain the first plate folded beneath the second plate.

20. The pivot device of claim 11 wherein the second plate comprises a portion of at least one of the first and second slots.

* * * * *